US008674007B2

(12) United States Patent
Siripurapu et al.

(10) Patent No.: US 8,674,007 B2
(45) Date of Patent: Mar. 18, 2014

(54) FLAME RETARDANT AND SCRATCH RESISTANT THERMOPLASTIC POLYCARBONATE COMPOSITIONS

(75) Inventors: Srinivas Siripurapu, Evansville, IN (US); Naveen Agarwal, Evansville, IN (US); Jan Pleun Lens, Breda (NL)

(73) Assignee: Sabic Innovative Plastics IP B.V. (NL)

( * ) Notice: Subject to any disclaimer, the term of this patent is extended or adjusted under 35 U.S.C. 154(b) by 1845 days.

(21) Appl. No.: 11/456,953

(22) Filed: Jul. 12, 2006

(65) Prior Publication Data
US 2008/0015290 A1    Jan. 17, 2008

(51) Int. Cl.
C08L 69/00    (2006.01)
C08L 83/10    (2006.01)
C08L 55/00    (2006.01)
C08K 5/523    (2006.01)

(52) U.S. Cl.
USPC ............ 524/127; 524/141; 525/67; 525/101; 525/464

(58) Field of Classification Search
None
See application file for complete search history.

(56) References Cited

U.S. PATENT DOCUMENTS

| | | | |
|---|---|---|---|
| 2,538,725 A | 4/1949 | Johnson et al. | |
| 2,535,014 A | 12/1950 | Johnson et al. | |
| 2,858,342 A | 10/1958 | Bender et al. | |
| 3,130,177 A | 4/1964 | Grabowski | |
| 3,511,895 A | 5/1970 | Kydonieus et al. | |
| 3,711,575 A | 1/1973 | Kakefuda et al. | |
| 3,944,631 A | 3/1976 | Yu et al. | |
| 3,981,944 A | 9/1976 | Okamoto et al. | |
| 4,052,466 A | 10/1977 | Sun | |
| 4,154,775 A | 5/1979 | Axelrod | |
| 4,304,899 A | 12/1981 | Mark et al. | |
| 4,381,359 A | 4/1983 | Idel et al. | |
| 4,387,251 A | 6/1983 | Meyer et al. | |
| 4,463,130 A | 7/1984 | Serini et al. | |
| 4,515,918 A * | 5/1985 | Nouvertne et al. | 524/504 |
| 4,520,187 A | 5/1985 | Mark et al. | |
| 4,576,996 A | 3/1986 | Mark et al. | |
| 4,624,986 A | 11/1986 | Weber et al. | |
| 4,731,414 A | 3/1988 | Ting | |
| 4,746,701 A | 5/1988 | Kress et al. | |
| 4,756,701 A | 7/1988 | Danko et al. | |
| 4,766,255 A | 8/1988 | Ong et al. | |
| 4,788,252 A | 11/1988 | de Boer et al. | |
| 4,831,079 A | 5/1989 | Ting | |
| 4,914,144 A * | 4/1990 | Muehlbach et al. | 524/139 |
| 4,975,461 A | 12/1990 | Misra | |
| 5,107,041 A | 4/1992 | Abe et al. | |
| 5,210,328 A | 5/1993 | Freitag et al. | |
| 5,380,795 A | 1/1995 | Gosens et al. | |
| 5,382,489 A | 1/1995 | Ojima et al. | |
| 5,414,045 A | 5/1995 | Sue et al. | |
| 5,488,086 A | 1/1996 | Umeda et al. | |
| 5,563,237 A | 10/1996 | Endo et al. | |
| 6,001,929 A | 12/1999 | Nodera et al. | |
| 6,001,953 A | 12/1999 | Davis et al. | |
| 6,060,577 A | 5/2000 | Davis | |
| 6,218,430 B1 | 4/2001 | Allegretto et al. | |
| 6,441,123 B1 | 8/2002 | Hariharan et al. | |
| 6,593,425 B2 | 7/2003 | Hariharan et al. | |
| 6,686,404 B1 | 2/2004 | Eckel et al. | |
| 6,866,909 B2 | 3/2005 | Wisnudel et al. | |
| 6,933,034 B2 | 8/2005 | Hariharan et al. | |
| 6,949,279 B2 | 9/2005 | Hariharan et al. | |
| 2002/0035207 A1 | 3/2002 | Hariharan et al. | |
| 2003/0092837 A1 | 5/2003 | Eichenauer | |
| 2003/0105226 A1 | 6/2003 | Cella et al. | |
| 2003/0119986 A1 | 6/2003 | Eichenauer | |
| 2004/0011999 A1 | 1/2004 | Murray | |
| 2005/0101757 A1 | 5/2005 | Glasgow et al. | |
| 2005/0171297 A1 * | 8/2005 | Koevoets et al. | 525/433 |

(Continued)

FOREIGN PATENT DOCUMENTS

DE    3332325    *    3/1985
EP    0567919 B1    11/1993

(Continued)

OTHER PUBLICATIONS

Chemical Registry No. 2362-14-3; no date.*

(Continued)

Primary Examiner — David Buttner
(74) Attorney, Agent, or Firm — Cantor Colburn LLP

(57) ABSTRACT

A flame retardant thermoplastic composition comprising in combination a polycarbonate homopolymer or copolymer comprising repeat carbonate units having the following structure:

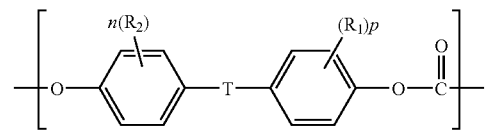

wherein $R_1$ and $R_2$ are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_1$-$C_5$ alkyl groups, $C_6$-$C_{13}$ aryl groups, and $C_7$-$C_{12}$ aryl alkyl groups; an impact modifier, wherein the impact modifier comprises wherein the impact modifier comprises a rubber modified thermoplastic resin comprising a discontinuous elastomeric phase dispersed in a rigid thermoplastic phase, and wherein the impact modifier has a specific mean particle size and Q value; and a flame retardant. The compositions have excellent scratch resistance as well as an improved balance of physical properties such as impact strength and spiral flow, while at the same time maintaining their good flame performance.

38 Claims, No Drawings

(56) References Cited

U.S. PATENT DOCUMENTS

| | | | |
|---|---|---|---|
| 2006/0030647 A1* | 2/2006 | Ebeling et al. | 524/115 |
| 2006/0074156 A1 | 4/2006 | Ebeling et al. | |
| 2007/0009741 A1 | 1/2007 | Boven et al. | |
| 2007/0149722 A1* | 6/2007 | Fujiguchi et al. | 525/464 |
| 2008/0015289 A1* | 1/2008 | Siripurapu | 524/115 |
| 2008/0015291 A1* | 1/2008 | Siripurapu et al. | 524/115 |

FOREIGN PATENT DOCUMENTS

| | | |
|---|---|---|
| EP | 0913408 A2 | 5/1999 |
| EP | 0913408 B1 | 5/1999 |
| EP | 1893659 B1 | 10/2008 |
| FR | 647454 | 11/1928 |
| GB | 2043083 A | 10/1980 |
| JP | 1069625 A | 3/1989 |
| WO | 9629365 A1 | 9/1996 |
| WO | 9713802 A1 | 4/1997 |
| WO | 0020504 A1 | 4/2000 |
| WO | 0183615 A2 | 11/2001 |

OTHER PUBLICATIONS

Machine translation of DE3332325 no date.*
ASTM D3363 Pencil Hardness Test.
PCT International Search Report for International Application No. PCT/US2007/070673.
PCT International Search Report for International Application No. PCT/US2007/070674.
S. Siripurapu, et al. "Flame Retardant and Scratch Resistant Thermoplastic Polycarbonate Compositions" co-pending patent application filed Jul. 12, 2006; U.S. Appl. No. 11/456,964.
EP0816434 A1, Jan. 7, 1998, Abstract Only, 2 pages.
JP06025399 A2, Jan. 2, 1994, Abstract Only, 1 page.
JP07333868 A2, Dec. 22, 1995, Abstract Only, 1 page.
JP08123056, May 17, 1996, Abstract Only, 1 page.
JP2001296423 A1, Oct. 26, 2011, Abstract Only, 1 page.
JP2002014480 A2, Abstract Only, 1 page.
JP2002040679 A2, Feb. 6, 2002, Abstract Only, 1 page.
JP2003292656 A2, Oct. 15, 2003, Abstract Only, 1 page.
JP2004149745 A2, May 27, 2004, Abstract Only, 1 page.
JP2004269719 A2, Sep. 30, 2004, Abstract Only, 1 page.
JP2005107379, Apr. 21, 2005, Abstract Only, 1 page.
JP2005119124 A1, May 12, 2005, Abstract Only, 1 page.
JP3475972 B2, Dec. 10, 2003, Abstract Only, 1 page.
JP63112655 A2, Aug. 17, 1988, Abstract Only, 1 page.

* cited by examiner

FLAME RETARDANT AND SCRATCH RESISTANT THERMOPLASTIC POLYCARBONATE COMPOSITIONS

BACKGROUND

This invention is directed to flame retardant thermoplastic compositions comprising aromatic polycarbonate, their method of manufacture, and method of use thereof, and in particular impact-modified thermoplastic polycarbonate compositions having improved scratch resistance.

Polycarbonates are useful in the manufacture of articles and components for a wide range of applications, from automotive parts to electronic appliances. Because of their broad use, particularly in electronic applications, it is desirable to provide polycarbonates with scratch resistance and flame retardancy. Many known flame retardant agents used with polycarbonates contain bromine and/or chlorine. Brominated and/or chlorinated flame retardant agents are less desirable because impurities and/or by-products arising from these agents can corrode the equipment associated with manufacture and use of the polycarbonates. Brominated and/or chlorinated flame retardant agents are also increasingly subject to regulatory restriction.

Nonhalogenated flame retardants have been proposed for polycarbonates, including various fillers, phosphorus-containing compounds, and certain salts. It has been difficult to meet the strictest standards of flame retardancy using the foregoing flame retardants, however, without also using brominated and/or chlorinated flame retardants, particularly in thin samples.

Polysiloxane-polycarbonate copolymers have also been proposed for use as non-brominated and non-chlorinated flame retardants. For example, U.S. Application Publication No. 2003/0105226 to Cella discloses a polysiloxane-modified polycarbonate comprising polysiloxane units and polycarbonate units, wherein the polysiloxane segments comprise 1 to 20 polysiloxane units. Use of other polysiloxane-modified polycarbonates are described in U.S. Pat. No. 5,380,795 to Gosen, U.S. Pat. No. 4,756,701 to Kress et al., U.S. Pat. No. 5,488,086 to Umeda et al., and EP 0 692 522B1 to Nodera, et al., for example.

While the foregoing flame retardants are suitable for their intended purposes, there nonetheless remains a continuing desire in the industry for continued improvement in flame performance while also providing good scratch resistance and maintaining other mechanical properties such as ductility. Flame retardant impact modified polycarbonate blends have been used in a variety of applications such as computer and business equipment, battery chargers, industrial housings, and the like. There is a need for impact modified blends with high flow characteristics are an attractive choice to mold large housings such as flat panel TV bezels as they offer a combination of interesting properties, including the capability to fill long flow lengths, adequate mechanical strength and flame retardancy. These impact modified blends also need to be free of chlorine and bromine flame retardant agents, but non-brominated and/or non-chlorinated flame retardants can adversely affect desirable physical properties of the polycarbonate compositions, particularly impact strength. While many parts made from impact modified blends have good mechanical properties, parts made from these blends typically suffer from poor scratch resistance due to the presence of the impact modifier. There is a need for flame retardant blends that provide good scratch resistance in combination with good mechanical properties, such as ductility, and good flame performance.

Aromatic polycarbonates are useful in the manufacture of articles and components for a wide range of applications, from automotive parts to electronic appliances. Impact modifiers are commonly added to aromatic polycarbonates to improve the toughness of the compositions. The impact modifiers often have a relatively rigid thermoplastic phase and an elastomeric (rubbery) phase, and may be formed by bulk or emulsion polymerization. Polycarbonate compositions comprising acrylonitrile-butadiene-styrene (ABS) impact modifiers are described generally, for example, in U.S. Pat. No. 3,130,177. Polycarbonate compositions comprising emulsion polymerized ABS impact modifiers are described in particular in U.S. Publication No. 2003/0119986. U.S. Publication No. 2003/0092837 discloses use of a combination of a bulk polymerized ABS and an emulsion polymerized ABS.

Of course, a wide variety of other types of impact modifiers for use in polycarbonate compositions have also been described. While suitable for their intended purpose of improving toughness, many impact modifiers may also adversely affect other properties, such as processability, hydrolytic stability, flame performance, and/or low temperature impact strength, as well as scratch resistance. There remains a continuing need in the art, therefore, for impact-modified thermoplastic polycarbonate compositions having a combination of good physical properties, including impact strength, flow and flame performance as well as scratch resistance.

SUMMARY OF THE INVENTION

In one embodiment, a thermoplastic composition comprises in combination a polycarbonate homopolymer or copolymer comprising repeat carbonate units having the following structure (17):

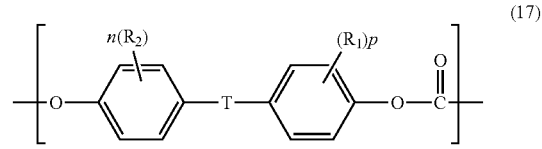

wherein $R_1$ and $R_2$ are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_1$-$C_5$ alkyl groups, $C_6$-$C_{13}$ aryl groups, and $C_7$-$C_{12}$ aryl alkyl groups; an impact modifier, wherein the impact modifier comprises a rubber modified thermoplastic resin comprising a discontinuous elastomeric phase dispersed in a rigid thermoplastic phase, wherein at least a portion of the rigid thermoplastic phase is grafted to the elastomeric phase, and wherein the rubber modified thermoplastic resin employs at least one rubber substrate for grafting and the rubber substrate comprises the discontinuous elastomeric phase of the composition, further wherein the rubber substrate must be susceptible to grafting by at least a portion of a graftable monomer and the rubber substrate is derived from polymerization by known methods of at least one monoethylenically unsaturated ($C_1$-$C_{12}$)alkyl(meth)acrylate monomers and mixtures comprising at least one of the monomers, and wherein the rigid thermoplastic phase comprises an alkenyl aromatic polymer having structural units derived from one or more alkenyl aromatic monomers and from one or more monoethylenically unsaturated nitrile monomers, and wherein the impact modifier has a particle size distribution having a mean particle size of the rubber substrate in a range of greater than about 200 nm and a Q value of greater than 1; and a flame retardant. The composition optionally comprises a polycarbonate-polysiloxane copolymer. In some embodiments, the repeat carbonate units of structure (17) comprise a dialkyl bisphenol polycarbonate homopolymer or copolymer component comprising repeat carbonate units having the following structure;

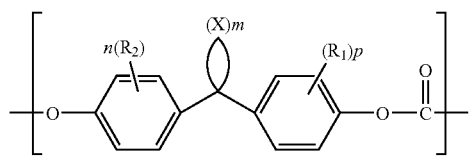

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of $R_1$ or $R_2$ is in the 3 or 3' position.

In one embodiment, a thermoplastic composition comprises in combination a polycarbonate homopolymer or copolymer comprising repeat carbonate units having the following structure (17):

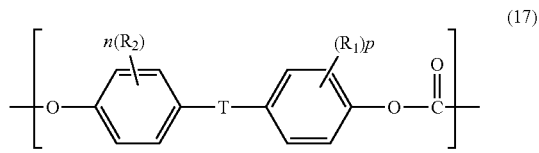

(17)

wherein $R_1$ and $R_2$ are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_1$-$C_5$ alkyl groups, $C_6$-$C_{13}$ aryl groups, and $C_7$-$C_{12}$ aryl alkyl groups; an impact modifier, wherein the impact modifier comprises a rubber modified thermoplastic resin comprising a discontinuous elastomeric phase dispersed in a rigid thermoplastic phase, wherein at least a portion of the rigid thermoplastic phase is grafted to the elastomeric phase, and wherein the rubber modified thermoplastic resin employs at least one rubber substrate for grafting and the rubber substrate comprises the discontinuous elastomeric phase of the composition, further wherein the rubber substrate must be susceptible to grafting by at least a portion of a graftable monomer and the rubber substrate is derived from polymerization by known methods of at least one monoethylenically unsaturated ($C_1$-$C_{12}$)alkyl(meth)acrylate monomers and mixtures comprising at least one of the monomers, and wherein the rigid thermoplastic phase comprises an alkenyl aromatic polymer having structural units derived from one or more alkenyl aromatic monomers and from one or more monoethylenically unsaturated nitrile monomers, and wherein the impact modifier has a particle size distribution having a particle size distribution having a mean particle size of the rubber substrate in a range of greater than about 400 nm and a Q value of less than 1. The composition optionally comprises a polycarbonate-polysiloxane copolymer. In some embodiments, the repeat carbonate units of structure (17) comprise a dialkyl bisphenol polycarbonate homopolymer or copolymer component comprising repeat carbonate units having the following structure;

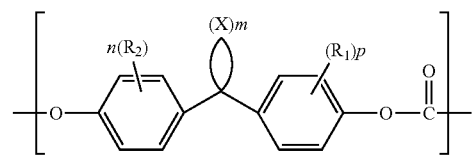

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of $R_1$ or $R_2$ is in the 3 or 3' position.

In another embodiment, an article comprises the above thermoplastic composition.

In still another embodiment, a method of manufacture of an article comprises molding, extruding, or shaping the above thermoplastic composition.

In another embodiment, a thermoplastic composition comprises in combination a DMBPC homopolymer or copolymer having monomer units having the structure

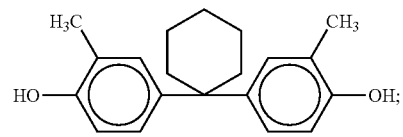

an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 200 nm and a Q value of greater than 1; and a flame retardant.

In another embodiment, a thermoplastic composition comprises, in combination, a DMBPC homopolymer or copolymer having monomer units having the structure

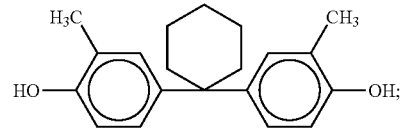

an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 400 nm and a Q value of less than 1; and a flame retardant.

In another embodiment, a thermoplastic composition comprises in combination a DMBPC homopolymer or copolymer having monomer units having the structure

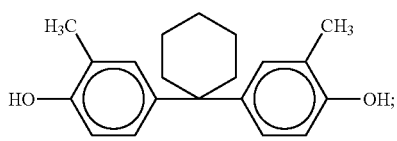

a polycarbonate-polysiloxane copolymer; an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 200 nm and a Q value of greater than 1; and a flame retardant.

In another embodiment, a thermoplastic composition comprises in combination a DMBPC homopolymer or copolymer having monomer units having the structure

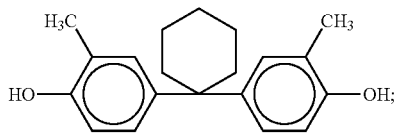

a polycarbonate-polysiloxane copolymer; an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 400 nm and a Q value of less than 1; and a flame retardant.

In still another embodiment, a method for the manufacture of a thermoplastic composition having improved impact strength and flame performance, the method comprising admixture of a polycarbonate homopolymer or copolymer comprising repeat carbonate units having the following structure (17):

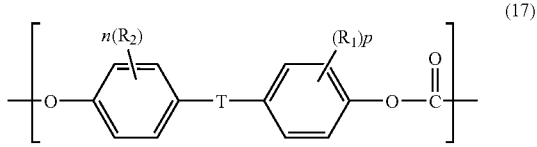

wherein $R_1$ and $R_2$ are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_1$-$C_5$ alkyl groups, $C_6$-$C_{13}$ aryl groups, and $C_7$-$C_{12}$ aryl alkyl groups; an impact modifier, wherein the impact modifier comprises a rubber modified thermoplastic resin comprising a discontinuous elastomeric phase dispersed in a rigid thermoplastic phase, wherein at least a portion of the rigid thermoplastic phase is grafted to the elastomeric phase, and wherein the rubber modified thermoplastic resin employs at least one rubber substrate for grafting and the rubber substrate comprises the discontinuous elastomeric phase of the composition, further wherein the rubber substrate must be susceptible to grafting by at least a portion of a graftable monomer and the rubber substrate is derived from polymerization by known methods of at least one monoethylenically unsaturated $(C_1$-$C_{12})$alkyl(meth)acrylate monomers and mixtures comprising at least one of the monomers, and wherein the rigid thermoplastic phase comprises an alkenyl aromatic polymer having structural units derived from one or more alkenyl aromatic monomers and from one or more monoethylenically unsaturated nitrile monomers, and wherein the impact modifier has a mean particle size of the rubber substrate in a range of greater than about 200 nm and a Q value of greater than 1; and a flame retardant. The composition optionally comprises a polycarbonate-polysiloxane copolymer. In some embodiments, the repeat carbonate units of structure (17) comprise a dialkyl bisphenol polycarbonate homopolymer or copolymer component comprising repeat carbonate units having the following structure;

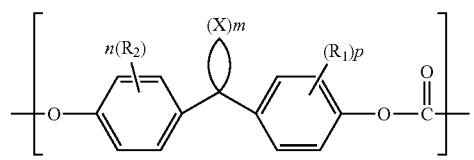

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of RI or $R_2$ is in the 3 or 3' position.

DETAILED DESCRIPTION OF THE INVENTION

It has been discovered by the inventors hereof that use of a specific impact modifier in combination with a polycarbonate homopolymer or copolymer having carbonate repeat units having a specific structure, and a flame retardant provides greatly improved balance of physical properties such as impact strength and flow as well as scratch resistance to thermoplastic compositions containing polycarbonate, while at the same time maintaining their good flame performance. The composition optionally comprises a polycarbonate-polysiloxane copolymer. The improvement in physical properties without significantly adversely affecting flame performance is particularly unexpected, especially with the higher levels of butadiene in the compositions, as the flame performance and physical properties of similar compositions can be significantly worse. It has further been discovered that an advantageous combination of other physical properties, in addition to good impact strength, can be obtained by use of the specific combination of impact modifiers and flame retardant.

In an embodiment, a thermoplastic composition comprises in combination; a polycarbonate homopolymer or copolymer comprising repeat carbonate units having the following structure (17):

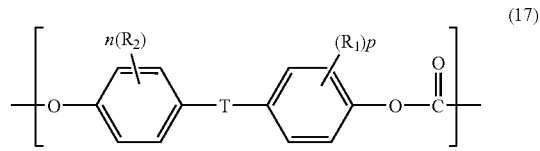

wherein $R_1$ and $R_2$ are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_1$-$C_5$ alkyl groups, $C_6$-$C_{13}$ aryl groups, and $C_7$-$C_{12}$ aryl alkyl groups; an impact modifier, wherein the impact modifier comprises a rubber modified thermoplastic resin comprising a discontinuous elastomeric phase dispersed in a rigid thermoplastic phase, wherein at least a portion of the rigid thermoplastic phase is grafted to the elastomeric phase, and wherein the rubber modified thermoplastic resin employs at least one rubber substrate for grafting and the rubber substrate comprises the discontinuous elastomeric phase of the composition, further wherein the rubber substrate must be susceptible to grafting by at least a portion of a graftable monomer and the rubber substrate is derived from polymerization by known methods of at least one monoethylenically unsaturated $(C_1$-$C_{12})$alkyl(meth)acrylate monomers and mixtures comprising at least one of the monomers, and wherein the rigid thermoplastic phase comprises an alkenyl aromatic polymer having structural units derived from one or more alkenyl aromatic monomers and from one or more monoethylenically unsaturated nitrile monomers, and wherein the impact modifier has a mean particle size of the rubber substrate in a range of greater than about 200 nm and a Q value of greater than 1; and a flame retardant. In an embodiment, the rigid thermoplastic phase of the impact modifier comprises styrene/acrylonitrile copolymers, alpha-methylstyrene/acrylonitrile copolymers, alpha-methylstyrene/styrene/acrylonitrile copolymers, or mixtures comprising two or more of the foregoing copolymers, and the rubber substrate of the impact modifier is butyl acrylate. In some embodiments, the impact modifier is acrylonitrile-styrene-acrylate or acrylate-modified acrylonitrile-styrene-acrylate. In some embodiments, the repeat carbonate units of structure (17) comprise a dialkyl bisphenol polycarbonate homopolymer or copolymer component comprising repeat carbonate units having the following structure;

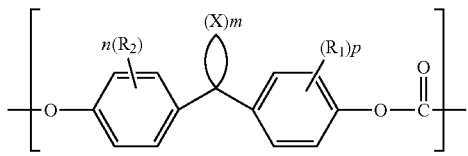

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of RI or $R_2$ is in the 3 or 3' position.

In another embodiment, a thermoplastic composition comprises in combination; a polycarbonate homopolymer or copolymer comprising repeat carbonate units having the following structure (17):

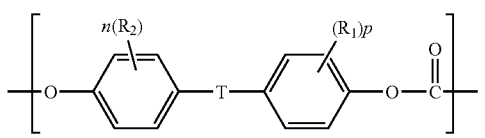

wherein $R_1$ and $R_2$ are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_1$-$C_5$ alkyl groups, $C_6$-$C_{13}$ aryl groups, and $C_7$-$C_{12}$ aryl alkyl groups; an impact modifier, wherein the impact modifier comprises a rubber modified thermoplastic resin comprising a discontinuous elastomeric phase dispersed in a rigid thermoplastic phase, wherein at least a portion of the rigid thermoplastic phase is grafted to the elastomeric phase, and wherein the rubber modified thermoplastic resin employs at least one rubber substrate for grafting and the rubber substrate comprises the discontinuous elastomeric phase of the composition, further wherein the rubber substrate must be susceptible to grafting by at least a portion of a graftable monomer and the rubber substrate is derived from polymerization by known methods of at least one monoethylenically unsaturated $(C_1$-$C_{12})$alkyl(meth)acrylate monomers and mixtures comprising at least one of the monomers, and wherein the rigid thermoplastic phase comprises an alkenyl aromatic polymer having structural units derived from one or more alkenyl aromatic monomers and from one or more monoethylenically unsaturated nitrile monomers, and wherein the impact modifier has a mean particle size of the rubber substrate in a range of greater than about 400 nm and a Q value of less than 1; and a flame retardant. In an embodiment, the rigid thermoplastic phase of the impact modifier comprises styrene/acrylonitrile copolymers, alpha-methylstyrene/acrylonitrile copolymers, alpha-methylstyrene/styrene/acrylonitrile copolymers, or mixtures comprising two or more of the foregoing copolymers, and the rubber substrate of the impact modifier is butyl acrylate. In some embodiments, the impact modifier is acrylonitrile-styrene-acrylate or acrylate-modified acrylonitrile-styrene-acrylate. In some embodiments, the repeat carbonate units of structure (17) comprise a dialkyl bisphenol polycarbonate homopolymer or copolymer component comprising repeat carbonate units having the following structure;

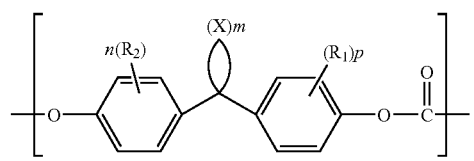

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of RI or $R_2$ is in the 3 or 3' position.

In some embodiments, the amount of carbonate units of formula (17) in the composition is at least 15 wt. %.

In another embodiment, a thermoplastic composition comprises in combination a DMBPC homopolymer or copolymer having monomer units having the structure

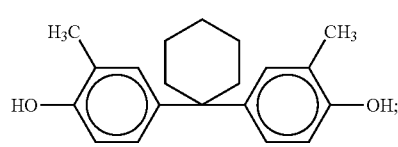

an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 200 nm and a Q value of greater than 1; and a flame retardant.

In another embodiment, a thermoplastic composition comprises, in combination, a DMBPC homopolymer or copolymer having monomer units having the structure

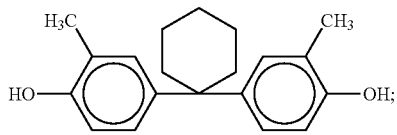

a polycarbonate-polysiloxane copolymer; an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 400 nm and a Q value of less than 1; and a flame retardant.

In another embodiment, a thermoplastic composition comprises in combination a DMBPC homopolymer or copolymer having monomer units having the structure

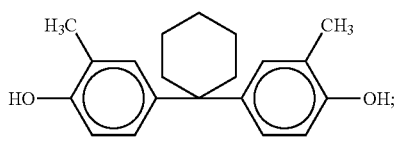

a polycarbonate-polysiloxane copolymer; an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 200 nm and a Q value of greater than 1; and a flame retardant. In some embodiments, the impact modifier has a mean particle size of from about 250 nm to about 350 nm and wherein 1<Q<2.

In another embodiment, a thermoplastic composition comprises, in combination, a DMBPC homopolymer or copolymer having monomer units having the structure

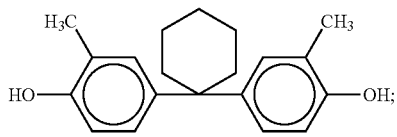

a polycarbonate-polysiloxane copolymer; an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 400 nm and a Q value of less than 1; and a flame retardant. In some embodiments, the impact modifier has a mean particle size of from about 400 nm to about 600 nm and wherein 0.2<Q<0.8.

In some embodiments, the thermoplastic composition further comprises an aromatic vinyl copolymer, such as SAN. In some embodiments, the flame retardant is a phosphorous containing flame retardant.

In other embodiments, the composition is capable of achieving a UL94 rating of V1 or V0 at a thickness of 1.5 mm or less. The composition may also have UL 94 5V time to drip at 2 mm of at least 60 seconds.

In some embodiments, an article is formed from the composition. In some embodiments, the article has a scratch resistance of HB or harder when measured according to the ASTM D3363 Pencil Hardness Test at 1 kg force.

As used herein, 'Q' refers to a measure of the particle size distribution. When the particle size is measured, the mean particle size is reported, as well as the equivalent diameters for the $10^{th}$, $50^{th}$ and $90^{th}$ percentile of the particle size distribution by volume. These diameters are referred to as D10, D50 and D90 respectively. Q is calculated by taking the difference between D10 and D90 and dividing it by D50 ((D10-D90)/D50). The particle size can be measured by any light scattering device that uses multiple scattering angles to generate the full particle size distribution.

As used herein, the term "polycarbonate" refers to a polymer comprising the same or different carbonate units, or a copolymer that comprises the same or different carbonate units, as well as one or more units other than carbonate (i.e. copolycarbonate); the term "aliphatic" refers to a hydrocarbon radical having a valence of at least one comprising a linear or branched array of carbon atoms which is not cyclic; "aromatic" refers to a radical having a valence of at least one comprising at least one aromatic group; "cycloaliphatic" refers to a radical having a valence of at least one comprising an array of carbon atoms which is cyclic but not aromatic; "alkyl" refers to a straight or branched chain monovalent hydrocarbon radical; "alkylene" refers to a straight or branched chain divalent hydrocarbon radical; "alkylidene" refers to a straight or branched chain divalent hydrocarbon radical, with both valences on a single common carbon atom; "alkenyl" refers to a straight or branched chain monovalent hydrocarbon radical having at least two carbons joined by a carbon-carbon double bond; "cycloalkyl" refers to a non-aromatic alicyclic monovalent hydrocarbon radical having at least three carbon atoms, with at least one degree of unsaturation; "cycloalkylene" refers to a non-aromatic alicyclic divalent hydrocarbon radical having at least three carbon atoms, with at least one degree of unsaturation; "aryl" refers to a monovalent aromatic benzene ring radical, or to an optionally substituted benzene ring system radical system fused to at least one optionally substituted benzene rings; "aromatic radical" refers to a radical having a valence of at least one comprising at least one aromatic group; examples of aromatic radicals include phenyl, pyridyl, furanyl, thienyl, naphthyl, and the like; "arylene" refers to a benzene ring diradical or to a benzene ring system diradical fused to at least one optionally substituted benzene ring; "alkylaryl" refers to an alkyl group as defined above substituted onto an aryl as defined above; "arylalkyl" refers to an aryl group as defined above substituted onto an alkyl as defined above; "alkoxy" refers to an alkyl group as defined above connected through an oxygen radical to an adjoining group; "aryloxy" refers to an aryl group as defined above connected through an oxygen radical to an adjoining group; and "direct bond", where part of a structural variable specification, refers to the direct joining of the substituents preceding and succeeding the variable taken as a "direct bond".

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl (C═O) group.

As used herein, the terms "polycarbonate" and "polycarbonate resin" means compositions having repeating structural carbonate units of formula (1):

in which at least about 60 percent of the total number of $R^1$ groups are aromatic organic radicals and the balance thereof are aliphatic, alicyclic, or aromatic radicals. In one embodiment each $R^1$ is an aromatic organic radical and, more specifically, a radical of formula (2):

$$A^1\text{-}Y^1\text{-}A^2\text{-} \qquad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

$$\text{HO-}A^1\text{-}Y^1\text{-}A^2\text{-OH} \qquad (3)$$

wherein $Y^1$, $A^1$ and $A^2$ are as described above. Also included are bisphenol compounds of general formula (4):

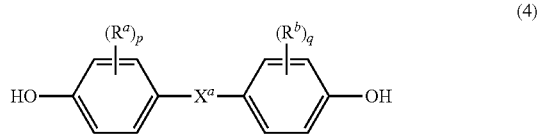

wherein $R^a$ and $R^b$ each represent a halogen atom or a monovalent hydrocarbon group and may be the same or different; p and q are each independently integers of 0 to 4; and $X^a$ represents one of the groups of formula (5):

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenyl-methane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like. Combinations comprising at least one of the foregoing dihydroxy compounds may also be used.

A nonexclusive list of specific examples of the types of bisphenol compounds that may be represented by formula (3) includes 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing bisphenol compounds may also be used.

Branched polycarbonates are also useful, as well as blends comprising a linear polycarbonate and a branched polycarbonate. The branched polycarbonates may be prepared by adding a branching agent during polymerization, for example a polyfunctional organic compound containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4 (1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents may be added at a level of about 0.05 to 2.0 wt. %. All types of polycarbonate end groups are contemplated as being useful in the polycarbonate composition, provided that such end groups do not significantly affect desired properties of the thermoplastic compositions.

Suitable polycarbonates can be manufactured by processes such as interfacial polymerization and melt polymerization.

Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, and the like) or a glycol (e.g., the bishaloformate of ethylene glycol, neopentyl glycol, polyethylene glycol, and the like). Combinations comprising at least one of the foregoing types of carbonate precursors may also be used.

Among the exemplary phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-188}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$ wherein X is Cl⁻, Br⁻, a $C_{1-8}$ alkoxy group or $C_{6-18}$ aryloxy group. An effective amount of a phase transfer catalyst may be about 0.1 to about 10 wt. % based on the weight of bisphenol in the phosgenation mixture. In another embodiment an effective amount of phase transfer catalyst may be about 0.5 to about 2 wt. % based on the weight of bisphenol in the phosgenation mixture.

Alternatively, melt processes may be used. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst. Volatile monohydric phenol is removed from the molten reactants by distillation and the polymer is isolated as a molten residue.

In one specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of about 0.3 to about 1.5 deciliters per gram (dl/gm), specifically about 0.45 to about 1.0 dl/gm. The polycarbonates may have a weight average molecular weight of about 10,000 to about 200,000, specifically about 20,000 to about 100,000 as measured by gel permeation chromatography. The polycarbonates are substantially free of impurities, residual acids, residual bases, and/or residual metals that may catalyze the hydrolysis of polycarbonate.

"Polycarbonate" and "polycarbonate resin" as used herein further includes copolymers comprising carbonate chain units together with a different type of chain unit. Such copolymers may be random copolymers, block copolymers, dendrimers and the like. One specific type of copolymer that may be used is a polyester carbonate, also known as a copolyester-polycarbonate. Such copolymers further contain, in addition to recurring carbonate chain units of the formula (1), repeating units of formula (6)

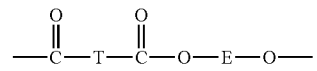

(6)

wherein E is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, E is a $C_{2-6}$ alkylene radical. In another embodiment, E is derived from an aromatic dihydroxy compound of formula (7):

(7)

wherein each $R^f$ is independently a halogen atom, a $C_{1-10}$ hydrocarbon group, or a $C_{1-10}$ halogen substituted hydrocarbon group, and n is 0 to 4. The halogen is preferably bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluororesorcinol, 2,4,5,6-tetrabromo resorcinol, and the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluorohydroquinone, 2,3,5,6-tetrabromo hydroquinone, and the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is about 10:1 to about 0.2:9.8. In another specific embodiment, E is a $C_{2-6}$ alkylene radical and T is p-phenylene, m-phenylene, naphthalene, a divalent cycloaliphatic radical, or a mixture thereof. This class of polyester includes the poly(alkylene terephthalates).

The copolyester-polycarbonate resins may have an intrinsic viscosity, as determined in chloroform at 25° C., of about 0.3 to about 1.5 deciliters per gram (dl/gm), specifically about 0.45 to about 1.0 dl/gm. The copolyester-polycarbonate resins may have a weight average molecular weight of about 10,000 to about 200,000, specifically about 20,000 to about 100,000 as measured by gel permeation chromatography.

The polycarbonate component may further comprise, in addition to the polycarbonates described above, combinations of the polycarbonates with other thermoplastic polymers, for example combinations of polycarbonate homopolymers and/or copolymers with polyesters and the like. As used herein, a "combination" is inclusive of all mixtures, blends, alloys, and the like. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end-use of the composition.

An example of suitable polyesters includes poly(alkylene terephthalates). Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated herein are the above polyesters with a minor amount, that is, from about 0.5 to about 10 percent by weight, of units derived from an aliphatic diacid and/or an aliphatic polyol to make copolyesters.

The blends of a polycarbonate and a polyester may comprise about 10 to about 99 wt. % polycarbonate and correspondingly about 1 to about 90 wt. % polyester, in particular a poly(alkylene terephthalate). In one embodiment, the blend comprises about 30 to about 70 wt. % polycarbonate and correspondingly about 30 to about 70 wt. % polyester. The foregoing amounts are based on the combined weight of the polycarbonate and polyester.

Although blends of polycarbonates with other polymers are contemplated, in one embodiment the polycarbonate component consists essentially of polycarbonate, i.e., the polycarbonate component comprises polycarbonate homopolymers and/or polycarbonate copolymers, and no other resins that would significantly adversely impact the impact strength of the thermoplastic composition. In another embodiment, the polycarbonate component consists of polycarbonate, i.e., is composed of only polycarbonate homopolymers and/or polycarbonate copolymers.

The thermoplastic composition further comprises a polycarbonate homopolymer or copolymer comprising repeat carbonate units having the following structure (17):

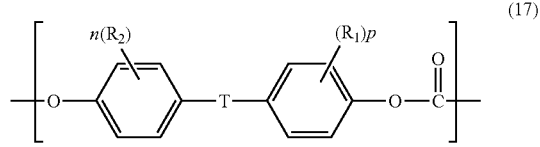

(17)

wherein $R_1$ and $R_2$ are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_1$-$C_5$ alkyl groups, $C_6$-$C_{13}$aryl groups, and $C_7$-$C_{12}$aryl alkyl groups.

In one embodiment, the structure of formula (17) comprises a dialkyl bisphenol repeat carbonate units having the following structure (18):

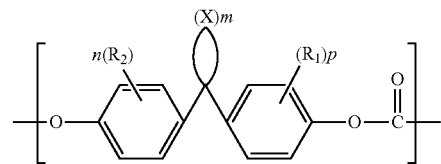

(18)

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of RI or $R_2$ is in the 3 or 3' position. In some embodiments, $R_1$ and $R_2$ are $C_1$ to $C_3$ alkyl, specifically $CH_3$.

In one embodiment, the dialkyl bisphenol polycarbonate comprises repeat units of DMBPC (dimethyl bisphenol cyclohexane or 1,1-bis(4-hydroxy-3-methylphenyl)cyclohexane)homopolymer or copolymer. The homopolymer of copolymer comprises DMBPC repeat units having the structure (19):

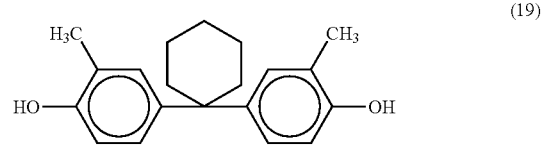

(19)

If a copolymer is desired, the DMBPC may be polymerized (or copolymerized) in polycarbonate. In an embodiment, DMBPC polycarbonate is used wherein the DMBPC comprises from 25 to 50 mol% DMBPC and from 75 to 50 mol % bisphenol A.

The method of making the DMBPC polycarbonate is not particularly limited. It may be produced by any known method of producing polycarbonate including the well-known interfacial process using phosgene and/or the melt process using a diaryl carbonate, such as diphenyl carbonate or bismethyl salicyl carbonate, as the carbonate source.

As mentioned above, it is possible to incorporate another monomer into the polymer chain to make a copolymer comprising monomer units other than those derived from structures (17), (18) or (19). Other monomers are not limited and are suitably derived from a dihydroxy composition other than that of the above structure (17), (18) or (19). Examples of other monomers include, but are not limited to, aromatic dihydroxy compounds such as bisphenols, dihydroxy benzenes such as hydroquinone, resorcinol, methylhydroquinone, butylhydroquinone, phenylhydroquinone, 4-phenylresorcinol and 4-methylresorcinol, and dihydroxy compounds comprising aliphatic diols and/or acids. As previously mentioned, diacid chloride, dicarboxylic acid or diester monomers could also be included in DMBPC homopolymers or DMBPC-PC copolymers to provide a polyestercarbonate.

In one embodiment, the amount of carbonate units of formulas (17), (18) or (19) is at least 15 wt. %, specifically from 15 to 90 wt. %, based on the total weight of the composition. In other embodiments, the amount of carbonate units of formulas (17), (18) or (19) is from 15 to 70 wt. %, or from 15 to 50 wt. %, based on the total weight of the composition.

The thermoplastic composition further includes an impact modifier. It has been found by the inventors hereof that an effective impact modifier accordingly comprises: a rubber modified thermoplastic resin comprising a discontinuous elastomeric phase and a rigid thermoplastic phase wherein at least a portion of the rigid thermoplastic phase is grafted to the elastomeric phase. The compositions are derived from grafting at least one rubber substrate. The rubber substrate comprises the discontinuous elastomeric phase of the composition. There is no particular limitation on the rubber substrate provided it is susceptible to grafting by at least a portion of a graftable monomer. The rubber substrate typically has a glass transition temperature, Tg, in one embodiment below about 0° C., in another embodiment below about minus 20° C., and in still another embodiment below about minus 30° C. Use of such an impact modifier, along with an appropriate flame retardant, can provide thermoplastic compositions having excellent physical properties and flame performance.

In various embodiments the rubber substrate is derived from polymerization by known methods of at least one monoethylenically unsaturated alkyl (meth)acrylate monomer selected from $(C_1-C_{12})$alkyl(meth)acrylate monomers and mixtures comprising at least one of the monomers. As used herein, the terminology "monoethylenically unsaturated" means having a single site of ethylenic unsaturation per molecule, and the terminology "(meth)acrylate monomers" refers collectively to acrylate monomers and methacrylate monomers. As used herein, the terminology "$(C_x-C_y)$", as applied to a particular unit, such as, for example, a chemical compound or a chemical substituent group, means having a carbon atom content of from "x" carbon atoms to "y" carbon atoms per such unit. For example, "$(C_1-C_{12})$alkyl" means a straight chain, branched or cyclic alkyl substituent group having from 1 to 12 carbon atoms per group and includes, but is not limited to, methyl, ethyl, n-propyl, iso-propyl, n-butyl, sec-butyl, t-butyl, pentyl, hexyl, heptyl, octyl, nonyl, decyl, undecyl and dodecyl. Suitable $(C_1-C_{12})$alkyl(meth)acrylate monomers include, but are not limited to, $(C_1-C_{12})$alkyl acrylate monomers, illustrative examples of which include ethyl acrylate, butyl acrylate, iso-pentyl acrylate, n-hexyl acrylate, and 2-ethyl hexyl acrylate; and their $(C_1-C_{12})$alkyl methacrylate analogs illustrative examples of which include methyl methacrylate, ethyl methacrylate, propyl methacrylate, isopropyl methacrylate, butyl methacrylate, hexyl methacrylate, and decyl methacrylate. In a particular embodiment of the present invention the rubber substrate comprises structural units derived from n-butyl acrylate.

In various embodiments the rubber substrate may also comprise structural units derived from at least one polyethylenically unsaturated monomer. As used herein, the terminology "polyethylenically unsaturated" means having two or more sites of ethylenic unsaturation per molecule. A polyethylenically unsaturated monomer is often employed to provide cross-linking of the rubber particles and to provide "graftlinking" sites in the rubber substrate for subsequent reaction with grafting monomers. Suitable polyethylenic unsaturated monomers include, but are not limited to, butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallylcyanurate, triallylisocyanurate, the acrylate of tricyclodecenylalcohol and mixtures comprising at least one of such monomers. In a particular embodiment the rubber substrate comprises structural units derived from triallylcyanurate.

In some embodiments the rubber substrate may optionally comprise structural units derived from minor amounts of other unsaturated monomers, for example those which are copolymerizable with an alkyl (meth)acrylate monomer used to prepare the rubber substrate. Suitable copolymerizable monomers include, but are not limited to, $C_1-C_{12}$aryl or haloaryl substituted acrylate, $C_1-C_{12}$aryl or haloaryl substituted methacrylate, or mixtures thereof; monoethylenically unsaturated carboxylic acids, such as, for example, acrylic acid, methacrylic acid and itaconic acid; glycidyl (meth)acrylate, hydroxy alkyl (meth)acrylate, hydroxy($C_1-C_{12}$)alkyl (meth)acrylate, such as, for example, hydroxyethyl methacrylate; ($C_4-C_{12}$)cycloalkyl (meth)acrylate monomers, such as, for example, cyclohexyl methacrylate; (meth)acrylamide monomers, such as, for example, acrylamide, methacrylamide and N-substituted-acrylamide or -methacrylamides; maleimide monomers, such as, for example, maleimide, N-alkyl maleimides, N-aryl maleimides and haloaryl substituted maleimides; maleic anhydride; vinyl methyl ether, vinyl esters, such as, for example, vinyl acetate and vinyl propionate. As used herein, the term "(meth)acrylamide" refers collectively to acrylamides and methacrylamides. Suitable copolymerizable monomers also include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, vinyl toluene, alpha-methyl vinyltoluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable.

The rubber substrate may be present in the rubber modified thermoplastic resin portion of the compositions of the invention in one embodiment at a level of from about 10 wt. % to about 94 wt. %; in another embodiment at a level of from about 10 wt. % to about 80 wt. %; in another embodiment at a level of from about 15 wt. % to about 80 wt. %; in another embodiment at a level of from about 35 wt. % to about 80 wt. %; in another embodiment at a level of from about 40 wt. % to about 80 wt. %; in another embodiment at a level of from about 25 wt. % to about 60 wt. % wt. %, and in still another embodiment at a level of from about 40 wt. % to about 50 wt. % based on the weight of the rubber modified thermoplastic resin. In other embodiments the rubber substrate may be present in the rubber modified thermoplastic resin portion of the compositions of the invention at a level of from about 5 to about 50 percent by weight; at a level of from about 8 wt. % to about 40 wt. %; or at a level of from about 10 wt. % to about 30 wt. % based on the weight of the rubber modified thermoplastic resin.

There are some limitations on the particle size distribution of the rubber substrate (sometimes referred to hereinafter as initial rubber substrate to distinguish it from the rubber substrate following grafting). In some embodiments, the rubber substrate may possess a particle size distribution having a mean particle size of the rubber substrate in a range of greater than about 200 nm and a Q value of greater than 1, specifically between about 250 and about 350 nm with $1<Q<2$, and more specifically between about 250 and about 350 nm with $1.2<Q<1.6$. In other embodiments, the rubber substrate may possess a particle size distribution having a mean particle size of the rubber substrate in a range of greater than about 400 nm and a Q value of less than 1, specifically between about 400 and about 600 nm with 0.2<Q<0.8. It is not desirable for the mean particle size of the rubber substrate to be less than about 200 nm.

To prepare the rubber modified thermoplastic resin used in the invention, monomers are polymerized in the presence of the rubber substrate to thereby form a graft copolymer, at least a portion of which is chemically grafted to the rubber phase. Any portion of graft copolymer not chemically grafted to rubber substrate comprises the rigid thermoplastic phase. The rigid thermoplastic phase comprises a thermoplastic polymer or copolymer that exhibits a glass transition temperature (Tg) in one embodiment of greater than about 25 °C., in another embodiment of greater than or equal to 90° C., and in still another embodiment of greater than or equal to 100° C.

In a particular embodiment the rigid thermoplastic phase of the rubber modified thermoplastic resin comprises structural units derived from at least one vinyl aromatic monomer, at least one monoethylenically unsaturated nitrile monomer, and at least one monomer selected from the group consisting of $(C_1-C_{12})$alkyl- and aryl-(meth)acrylate monomers. Suitable $(C_1-C_{12})$alkyl- and aryl-(meth)acrylate monomers, vinyl aromatic monomers and monoethylenically unsaturated nitrile monomers include those set forth hereinabove in the description of the rubber substrate. In a particular embodiment the rigid thermoplastic phase comprises a vinyl aromatic polymer having first structural units derived from one or more vinyl aromatic monomers; second structural units derived from one or more monoethylenically unsaturated nitrile monomers; and third structural units derived from one or more monomers selected from the group consisting of $(C_1-C_{12})$alkyl- and aryl-(meth)acrylate monomers. Suitable vinyl aromatic polymers comprise at least about 20 wt. % structural units derived from one or more vinyl aromatic monomers. Examples of such vinyl aromatic polymers include, but are not limited to, styrene/acrylonitrile/methyl methacrylate copolymer, alpha-methylstyrene/acrylonitrile/methyl methacrylate copolymer and styrene/alpha-methylstyrene/acrylonitrile/methyl methacrylate copolymer. These copolymers may be used for the rigid thermoplastic phase either individually or as mixtures.

When structural units in copolymers are derived from one or more monoethylenically unsaturated nitrile monomers, then the nitrile monomer content in the copolymer comprising the graft copolymer and the rigid thermoplastic phase may be in one embodiment in a range of between about 5 wt. % and about 40 wt. %, in another embodiment in a range of between about 5 wt. % and about 30 wt. %, in another embodiment in a range of between about 10 wt. % and about 30 wt. %, and in yet another embodiment in a range of between about 15 wt. % and about 30 wt. %, based on the weight of the copolymer comprising the graft copolymer and the rigid thermoplastic phase.

The amount of grafting that takes place between the rubber phase and monomers comprising the rigid thermoplastic phase of the rubber modified thermoplastic resin varies with the relative amount and composition of the rubber phase. In one embodiment, greater than about 10 wt. % of the rigid thermoplastic phase is chemically grafted to the rubber, based on the total amount of rigid thermoplastic phase in the composition. In another embodiment, greater than about 15 wt. % of the rigid thermoplastic phase is chemically grafted to the rubber, based on the total amount of rigid thermoplastic phase in the composition. In still another embodiment, greater than about 20 wt. % of the rigid thermoplastic phase is chemically grafted to the rubber, based on the total amount of rigid thermoplastic phase in the composition. In particular embodiments the amount of rigid thermoplastic phase chemically grafted to the rubber may be in a range of between about 5 wt. % and about 90 wt. %; between about 10 wt. % and about 90 wt. %; between about 15 wt. % and about 85 wt. %; between about 15% and about 50 wt. %; or between about 20 wt. % and about 50 wt. %, based on the total amount of rigid thermoplastic phase in the composition. In yet other embodiments, about 40 wt. % to 90 wt. % of the rigid thermoplastic phase is free, that is, non-grafted.

The rigid thermoplastic phase of the rubber modified thermoplastic resin may be present in compositions of the invention in one embodiment at a level of from about 85 wt. % to about 6 wt. %; in another embodiment at a level of from about 65 wt. % to about 6 wt. %; in another embodiment at a level of from about 60 wt. % to about 20 wt. %; in another embodiment at a level of from about 75 wt. % to about 40 wt. %, and in still another embodiment at a level of from about 60 wt. % to about 50 wt. % based on the weight of the rubber modified thermoplastic resin. In other embodiments rigid thermoplastic phase may be present in compositions of the invention in a range of between about 90 wt. % and about 30 wt. %, based on the weight of the rubber modified thermoplastic resin.

The rigid thermoplastic phase of the rubber modified thermoplastic resin may be formed solely by polymerization carried out in the presence of rubber substrate or by addition of one or more separately polymerized rigid thermoplastic polymers to a rigid thermoplastic polymer that has been polymerized in the presence of the rubber substrate. When at least a portion of separately synthesized rigid thermoplastic phase is added to compositions, then the amount of the separately synthesized rigid thermoplastic phase added is in an amount in a range of between about 30 wt. % and about 80 wt. % based on the weight of the rubber modified thermoplastic resin. Two or more different rubber substrates each possessing a different number average particle size may be separately employed in such a polymerization reaction and then the products blended together. In illustrative embodiments wherein such products each possessing a different number average particle size of initial rubber substrate are blended together, then the ratios of the substrates may be in a range of about 90:10 to about 10:90, or in a range of about 80:20 to about 20:80, or in a range of about 70:30 to about 30:70. In some embodiments an initial rubber substrate with smaller particle size is the major component in such a blend containing more than one particle size of initial rubber substrate.

The rigid thermoplastic phase of the rubber modified thermoplastic resin may be made according to known processes, for example, mass polymerization, emulsion polymerization, suspension polymerization or combinations thereof, wherein at least a portion of the rigid thermoplastic phase is chemically bonded, i.e., "grafted" to the rubber phase via reaction with unsaturated sites present in the rubber phase. The grafting reaction may be performed in a batch, continuous or semi-continuous process. Representative procedures include, but are not limited to, those taught in U.S. Pat. No. 3,944,631; and U.S. patent application Ser. No. 08/962,458, filed Oct. 31, 1997. The unsaturated sites in the rubber phase are provided, for example, by residual unsaturated sites in those structural units of the rubber that were derived from a graftlinking monomer.

In some embodiments of the present invention the rubber modified thermoplastic resin is made by a process which comprises monomer grafting to rubber substrate with concomitant formation of rigid thermoplastic phase, which process is performed in stages wherein at least one first monomer is grafted to rubber substrate followed by at least one second monomer different from the first monomer. In the present context the change from one graft stage to the next is defined as that point where there is a change in the identity of at least one monomer added to the rubber substrate for grafting. In one embodiment of the present invention formation of rigid thermoplastic phase and grafting to rubber substrate are performed by feeding at least one first monomer over time to a reaction mixture comprising rubber substrate. In this context a second graft stage occurs when at least one different monomer is introduced into the feed stream in the presence or absence of at least one first monomer.

At least two stages are employed for grafting, although additional stages may be employed. The first graft stage is performed with one or more monomers comprising vinyl aromatic monomers, monoethylenically unsaturated nitrile monomers, and optionally ($C_1$-$C_{12}$)alkyl- and aryl-(meth)acrylate monomers. In a particular embodiment grafting is performed in a first stage with a mixture of monomers, at least one of which is selected from the group consisting of vinyl aromatic monomers and at least one of which is selected from the group consisting of monoethylenically unsaturated nitrile monomers. When a mixture comprising at least one vinyl aromatic monomer and at least one monoethylenically unsaturated nitrile monomer is employed in the first graft stage, then the wt./wt. ratio of vinyl aromatic monomer to monoethylenically unsaturated nitrile monomer is in one embodiment in a range of between about 1:1 and about 6:1, in another embodiment in a range of between about 1.5:1 and about 4:1, in still another embodiment in a range of between about 2:1 and about 3:1, and in still another embodiment in a range of between about 2.5:1 and about 3:1. In one preferred embodiment the wt./wt. ratio of vinyl aromatic monomer to monoethylenically unsaturated nitrile monomer employed in the first graft stage is about 2.6:1.

In at least one subsequent stage following the first stage, grafting is performed with one or more monomers comprising vinyl aromatic monomers, monoethylenically unsaturated nitrile monomers, and optionally ($C_1$-$C_{12}$)alkyl- and aryl-(meth)acrylate monomers. In a particular embodiment grafting is performed in at least one subsequent stage with one or more monomers, at least one of which is selected from the group consisting of ($C_1$-$C_{12}$)alkyl- and aryl-(meth)acrylate monomers. In another particular embodiment grafting is performed in at least one subsequent stage with a mixture of monomers, at least one of which is selected from the group consisting of ($C_1$-$C_{12}$)alkyl- and aryl-(meth)acrylate monomers and at least one of which is selected from the group consisting of vinyl aromatic monomers and monoethylenically unsaturated nitrile monomers. In another particular embodiment grafting is performed in at least one subsequent stage with a mixture of monomers, one of which is selected from the group consisting of ($C_1$-$C_{12}$)alkyl- and aryl-(meth)acrylate monomers; one of which is selected from the group consisting of vinyl aromatic monomers and one of which is selected from the group consisting of monoethylenically unsaturated nitrile monomers. The ($C_1$-$C_{12}$)alkyl- and aryl-(meth)acrylate monomers, vinyl aromatic monomers and monoethylenically unsaturated nitrile monomers include those described hereinabove.

In the first graft stage the total amount of monomer employed for grafting to rubber substrate is in one embodiment in a range of between about 5 wt. % and about 98 wt. %; in another embodiment in a range of between about 5 wt. % and about 95 wt. %; in another embodiment in a range of between about 10 wt. % and about 90 wt. %; in another embodiment in a range of between about 15 wt. % and about 85 wt. %; in another embodiment in a range of between about 20 wt. % and about 80 wt. %; and in yet another embodiment in a range of between about 30 wt. % and about 70 wt. %, based on the total weight of monomer employed for grafting in all stages. In one particular embodiment the total amount of monomer employed for grafting to rubber substrate in the first stage is in a range of between about 30 wt. % and about 95 wt. % based on the total weight of monomer employed for grafting in all stages. Further monomer is then grafted to rubber substrate in one or more stages following the first stage. In one particular embodiment all further monomer is grafted to rubber substrate in one second stage following the first stage.

At least one ($C_1$-$C_{12}$)alkyl- and aryl-(meth)acrylate monomer is employed for grafting to rubber substrate in either a first stage, or in a second stage, or in both a first and a second stage of grafting monomers to rubber substrate. The total amount of the (meth)acrylate monomer employed is in one embodiment in a range of between about 95 wt. % and about 2 wt. %; in another embodiment in a range of between about 80 wt. % and about 2 wt. %; in another embodiment in a range of between about 70 wt. % and about 2 wt. %; in another embodiment in a range of between about 50 wt. % and about 2 wt. %; in another embodiment in a range of between about 45 wt. % and about 2 wt. %; and in yet another embodiment in a range of between about 45 wt. % and about 5 wt. %, based on the total weight of all monomers employed for grafting. In other embodiments of the invention the total amount of the (meth)acrylate monomer employed is in a range of between about 48 wt. % and about 18 wt. %.

In a mixture of monomers comprising at least one ($C_1$-$C_{12}$) alkyl- and aryl-(meth)acrylate monomer, the wt./wt. ratio of the (meth)acrylate monomer to the totality of other monomers employed for grafting to rubber substrate in any particular stage is in one embodiment in a range of between about 10:1 and about 1:10; in another embodiment in a range of between about 8:1 and about 1:8; in another embodiment in a range of between about 5:1 and about 1:5; in another embodiment in a range of between about 4:1 and about 1:4; in another embodiment in a range of between about 3:1 and about 1:3; in another embodiment in a range of between about 2:1 and about 1:2; and in yet another embodiment in a range of between about 1.5:1 and about 1:1.5.

In one embodiment the rubber modified thermoplastic resin is an ASA (acrylonitrile-styrene-acrylate) resin such as that manufactured and sold by General Electric Company under the trademark GELOY®. In one embodiment a suitable ASA resin is an acrylate-modified acrylonitrile-styrene-acrylate resin. ASA resins include, for example, those disclosed in U.S. Pat. No. 3,711,575. ASA resins also comprise those described in commonly assigned U.S. Pat. Nos. 4,731,414 and 4,831,079. In some embodiments of the invention where an acrylate-modified ASA is used, the ASA component further comprises structural units derived from monomers selected from the group consisting of $C_1$ to $C_{12}$ alkyl- and aryl-(meth)acrylate as part of either the rigid phase, the rubber phase, or both. Such copolymers are sometimes referred to as acrylate-modified acrylonitrile-styrene-acrylate resins, or acrylate-modified ASA resins. An example of a suitable monomer is methyl methacrylate and the resulting modified polymer is sometimes referred to hereinafter as "MMA-ASA". Suitable resins may comprise recycled or reground thermoplastic resin or rubber modified thermoplastic resin.

The composition may further comprise an additional impact modifier, such as bulk polymerized ABS. The bulk polymerized ABS comprises an elastomeric phase comprising (i) butadiene and having a Tg of less than about 10° C., and (ii) a rigid polymeric phase having a Tg of greater than about 15° C. and comprising a copolymer of a monovinylaromatic monomer such as styrene and an unsaturated nitrile such as acrylonitrile. Such ABS polymers may be prepared by first providing the elastomeric polymer, then polymerizing the constituent monomers of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Polybutadiene homopolymer may be used as the elastomer phase. Alternatively, the elastomer phase of the bulk polymerized ABS comprises butadiene copolymerized with up to about 25 wt. % of another conjugated diene monomer of formula (8):

(8)

wherein each $X^b$ is independently $C_1$-$C_5$ alkyl. Examples of conjugated diene monomers that may be used are isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. A specific conjugated diene is isoprene.

The elastomeric butadiene phase may additionally be copolymerized with up to 25 wt %, specifically up to about 15 wt. %, of another comonomer, for example monovinylaromatic monomers containing condensed aromatic ring structures such as vinyl naphthalene, vinyl anthracene and the like, or monomers of formula (9):

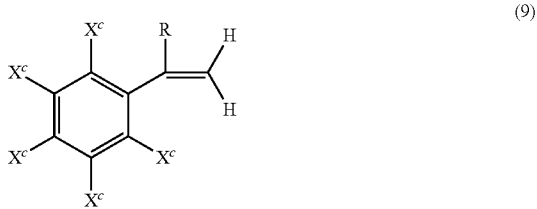

(9)

wherein each $X^c$ is independently hydrogen, $C_1$-$C_{12}$alkyl, $C_3$-$C_{12}$cycloalkyl, $C_6$-$C_{12}$aryl, $C_7$-$C_{12}$aralkyl, $C_7$-$C_{12}$alkaryl, $C_1$-$C_{12}$alkoxy, $C_3$-$C_{12}$cycloalkoxy, $C_6$-$C_{12}$aryloxy, chloro, bromo, or hydroxy, and R is hydrogen, $C_1$-$C_5$ alkyl, bromo, or chloro. Examples of suitable monovinylaromatic monomers copolymerizable with the butadiene include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing monovinylaromatic monomers. In one embodiment, the butadiene is copolymerized with up to about 12 wt. %, specifically about 1 to about 10 wt. % styrene and/or alpha-methyl styrene.

Other monomers that may be copolymerized with the butadiene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10):

(10)

wherein R is hydrogen, $C_1$-$C_5$ alkyl, bromo, or chloro, and $X^c$ is cyano, $C_1$-$C_{12}$ alkoxycarbonyl, $C_1$-$C_{12}$aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the butadiene.

The particle size of the butadiene phase is not critical, and may be, for example about 0.01 to about 20 micrometers, specifically about 0.5 to about 10 micrometers, more specifically about 0.6 to about 1.5 micrometers may be used for bulk polymerized rubber substrates. Particle size may be measured by light transmission methods or capillary hydrodynamic chromatography (CHDF). The butadiene phase may provide about 5 to about 95 wt. % of the total weight of the ABS impact modifier copolymer, more specifically about 20 to about 90 wt. %, and even more specifically about 40 to about 85 wt. % of the ABS impact modifier, the remainder being the rigid graft phase.

The rigid graft phase comprises a copolymer formed from a styrenic monomer composition together with an unsaturated monomer comprising a nitrile group. As used herein, "styrenic monomer" includes monomers of formula (9) wherein each $X^c$ is independently hydrogen, $C_1$-$C_4$ alkyl, phenyl, $C_7$-$C_9$ aralkyl, $C_7$-$C_9$ alkaryl, $C_1$-$C_4$ alkoxy, phenoxy, chloro, bromo, or hydroxy, and R is hydrogen, $C_1$-$C_2$ alkyl, bromo, or chloro. Specific examples styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like. Combinations comprising at least one of the foregoing styrenic monomers may be used.

Further as used herein, an unsaturated monomer comprising a nitrile group includes monomers of formula (10) wherein R is hydrogen, $C_1$-$C_5$ alkyl, bromo, or chloro, and $X^c$ is cyano. Specific examples include acrylonitrile, ethacrylonitrile, methacrylonitrile, alpha-chloroacrylonitrile, beta-chloroacrylonitrile, alpha-bromoacrylonitrile, and the like. Combinations comprising at least one of the foregoing monomers may be used.

The rigid graft phase of the bulk polymerized ABS may further optionally comprise other monomers copolymerizable therewith, including other monovinylaromatic monomers and/or monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10). Specific comonomers include $C_1$-$C_4$ alkyl (meth)acrylates, for example methyl methacrylate.

The rigid copolymer phase will generally comprise about 10 to about 99 wt. %, specifically about 40 to about 95 wt. %, more specifically about 50 to about 90 wt. % of the styrenic monomer; about 1 to about 90 wt. %, specifically about 10 to about 80 wt. %, more specifically about 10 to about 50 wt. % of the unsaturated monomer comprising a nitrile group; and 0 to about 25 wt. %, specifically 1 to about 15 wt. % of other comonomer, each based on the total weight of the rigid copolymer phase.

The bulk polymerized ABS copolymer may further comprise a separate matrix or continuous phase of ungrafted rigid copolymer that may be simultaneously obtained with the ABS. The ABS may comprise about 40 to about 95 wt. % elastomer-modified graft copolymer and about 5 to about 65 wt. % rigid copolymer, based on the total weight of the ABS. In another embodiment, the ABS may comprise about 50 to about 85 wt. %, more specifically about 75 to about 85 wt. % elastomer-modified graft copolymer, together with about 15 to about 50 wt. %, more specifically about 15 to about 25 wt. % rigid copolymer, based on the total weight of the ABS.

A variety of bulk polymerization methods for ABS-type resins are known. In multizone plug flow bulk processes, a series of polymerization vessels (or towers), consecutively connected to each other, providing multiple reaction zones. The elastomeric butadiene may be dissolved in one or more of the monomers used to form the rigid phase, and the elastomer solution is fed into the reaction system. During the reaction, which may be thermally or chemically initiated, the elastomer is grafted with the rigid copolymer (i.e., SAN). Bulk copolymer (referred to also as free copolymer, matrix copolymer, or non-grafted copolymer) is also formed within the continuous phase containing the dissolved rubber. As polymerization continues, domains of free copolymer are formed within the continuous phase of rubber/comonomers to provide a two-phase system. As polymerization proceeds, and more free copolymer is formed, the elastomer-modified copolymer starts to disperse itself as particles in the free copolymer and the free copolymer becomes a continuous phase (phase inversion). Some free copolymer is generally occluded within the elastomer-modified copolymer phase as well. Following the phase inversion, additional heating may be used to complete polymerization. Numerous modifications of this basis process have been described, for example in U.S. Pat. No. 3,511,895, which describes a continuous bulk ABS process that provides controllable molecular weight distribution and microgel particle size using a three-stage reactor system. In the first reactor, the elastomer/monomer solution is charged into the reaction mixture under high agitation to precipitate discrete rubber particle uniformly throughout the reactor mass before appreciable cross-linking can occur. Solids levels of the first, the second, and the third reactor are carefully controlled so that molecular weights fall into a desirable range. U.S. Pat. No. 3,981,944 discloses extraction of the elastomer particles using the styrenic monomer to dissolve/disperse the elastomer particles, prior to addition of the unsaturated monomer comprising a nitrile group and any other comonomers. U.S. Pat. No. 5,414,045 discloses reacting in a plug flow grafting reactor a liquid feed composition comprising a styrenic monomer composition, an unsaturated nitrile monomer composition, and an elastomeric butadiene polymer to a point prior to phase inversion, and reacting the first polymerization product (grafted elastomer) therefrom in a continuous-stirred tank reactor to yield a phase inverted second polymerization product that then can be further reacted in a finishing reactor, and then devolatilized to produce the desired final product.

Additional impact modifiers include elastomer-modified graft copolymers comprising (i) an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than about 50 wt. % of a copolymerizable monomer; olefin rubbers such as ethylene propylene copolymers (EPR) or ethylene-propylene-diene monomer rubbers (EPDM); ethylene-vinyl acetate rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. In one embodiment, the elastomer phase of the impact modifier is diene or butadiene based.

Suitable conjugated diene monomers for preparing the elastomer phase are of formula (8) above wherein each $X^b$ is independently hydrogen, $C_1$-$C_5$ alkyl, and the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Monomers that are suitable for copolymerization with the conjugated diene include monovinylaromatic monomers containing condensed aromatic ring structures, such as vinyl naphthalene, vinyl anthracene and the like, or monomers of formula (9) above, wherein each $X^c$ is independently hydrogen, $C_1$-$C_{12}$alkyl, $C_3$-$C_{12}$cycloalkyl, $C_6$-$C_{12}$aryl, $C_7$-$C_{12}$aralkyl, $C_7$-$C_{12}$alkaryl, $C_1$-$C_{12}$alkoxy, $C_3$-$C_{12}$cycloalkoxy, $C_6$-$C_{12}$aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, combinations comprising at least one of the foregoing compounds, and the like. Styrene and/or alpha-methylstyrene are commonly used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (10) wherein R is hydrogen, $C_1$-$C_5$ alkyl, bromo, or chloro, and $X^c$ is cyano, $C_1$-$C_{12}$alkoxycarbonyl, $C_1$-$C_{12}$aryloxycarbonyl, hydroxy carbonyl, and the like. Examples of monomers of formula (10) include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Certain (meth)acrylate monomers may also be used to provide the elastomer phase, including cross-linked, particulate emulsion homopolymers or copolymers of $C_{1-16}$ alkyl (meth)acrylates, specifically $C_{1-9}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-16}$ alkyl (meth)acrylate monomers may optionally be polymerized in admixture with up to 15 wt. % of comonomers of generic formulas (8), (9), or (10) as broadly described above. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of about 0.001 to about 25 micrometers, specifically about 0.01 to about 15 micrometers, or even more specifically about 0.1 to about 8 micrometers may be used for emulsion based polymerized rubber lattices. A particle size of about 0.5 to about 10 micrometers, specifically about 0.6 to about 1.5 micrometers may be used for bulk polymerized rubber substrates. The elastomer phase may be a particulate, moderately cross-linked copolymer derived from conjugated butadiene or $C_{4-9}$ alkyl acrylate rubber, and preferably has a gel content greater than 70%. Also suitable are copolymers derived from mixtures of butadiene with styrene, acrylonitrile, and/or $C_{4-6}$ alkyl acrylate rubbers.

The elastomeric phase may provide about 5 to about 95 wt. % of the elastomer-modified graft copolymer, more specifically about 20 to about 90 wt. %, and even more specifically about 40 to about 85 wt. %, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above broadly described monovinylaromatic monomers of formula (9) may be used in the rigid graft phase, including styrene, alpha-methyl styrene, halostyrenes such as dibromostyrene, vinyltoluene, vinylxylene, butylstyrene, para-hydroxystyrene, methoxystyrene, and others, or combinations comprising at least one of the foregoing monovinylaromatic monomers. Suitable comonomers include, for example, the above broadly described monovinylic monomers and/or monomers of the general formula (10). In one embodiment, R is hydrogen or $C_1$-$C_2$ alkyl, and $X^c$ is cyano or $C_1$-$C_{12}$alkoxycarbonyl. Specific examples of suitable comonomers for use in the rigid phase include acrylonitrile, ethacrylonitrile, methacrylonitrile, methyl (meth) acrylate, ethyl (meth)acrylate, n-propyl (meth)acrylate, isopropyl (meth)acrylate, and the like, and combinations comprising at least one of the foregoing comonomers.

In one specific embodiment, the rigid graft phase is formed from styrene or alpha-methyl styrene copolymerized with ethyl acrylate and/or methyl methacrylate. In other specific embodiments, the rigid graft phase is formed from styrene copolymerized with methyl methacrylate; and styrene copolymerized with methyl methacrylate and acrylonitrile.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt. % of monovinyl aromatic monomer, specifically about 30 to about 100 wt. %, more specifically about 50 to about 90 wt. % monovinylaromatic monomer, with the balance being comonomer(s).

Depending on the amount of elastomer-modified polymer present, a separate matrix or continuous phase of ungrafted rigid polymer or copolymer may be simultaneously obtained along with the additional elastomer-modified graft copolymer. Typically, such impact modifiers comprise about 40 to about 95 wt. % elastomer-modified graft copolymer and about 5 to about 65 wt. % rigid (co)polymer, based on the total weight of the impact modifier. In another embodiment, such impact modifiers comprise about 50 to about 85 wt. %, more specifically about 75 to about 85 wt. % rubber-modified rigid copolymer, together with about 15 to about 50 wt. %, more specifically about 15 to about 25 wt. % rigid (co)polymer, based on the total weight of the impact modifier.

Specific examples of elastomer-modified graft copolymers include but are not limited to, methyl methacrylate-acrylonitrile-butadiene-styrene (MABS), methyl methacrylate-butadiene-styrene (MBS), and acrylonitrile-ethylene-propylene-diene-styrene (AES).

If desired, the optional additional impact modifier may be prepared by an emulsion polymerization process that is free of basic species, for example species such as alkali metal salts of $C_{6-30}$ fatty acids, for example sodium stearate, lithium stearate, sodium oleate, potassium oleate, and others, alkali metal carbonates, amines such as dodecyl dimethyl amine, dodecyl amine, and others, and ammonium salts of amines, if desired, but it is not a requirement. Such materials are commonly used as polymerization aids, that is, surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers, if desired. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and combinations comprising at least one of the foregoing surfactants. A specific surfactant is a $C_{6-16}$, specifically a $C_{8-12}$ alkyl sulfonate. This emulsion polymerization process is described and disclosed in various patents and literature of such companies as Rohm & Haas and General Electric Company.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_9$ linear or branched hydrocarbyl group and $R^e$ is a branched $C_3$-$C_{16}$ hydrocarbyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, for example, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and others known in the art, alone or in combination. The polymerizable alkenyl-containing organic material may be, for example, a monomer of formula (9) or (10), for example, styrene, alpha-methylstyrene, acrylonitrile, methacrylonitrile, or an unbranched (meth)acrylate such as methyl methacrylate, 2-ethylhexyl methacrylate, methyl acrylate, ethyl acrylate, n-propyl acrylate, and others known in the art, alone or in combination.

The at least one first graft link monomer may be an (acryloxy)alkoxysilane, a (mercaptoalkyl)alkoxysilane, a vinylalkoxysilane, or an allylalkoxysilane, alone or in combination, for example, (gamma-methacryloxypropyl)(dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from about 30° C. to about 110° C. to form a silicone rubber latex, in the presence of a surfactant such as dodecylbenzenesulfonic acid. Alternatively, a cyclic siloxane such as cyclooctamethyltetrasiloxane and an tetraethoxyorthosilicate may be reacted with a first graft link monomer such as (gamma-methacryloxypropyl)methyldimethoxysilane, to afford silicone rubber having an average particle size from about 100 nanometers to about 2 microns. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from about 100 nanometers to about two micrometers.

The composition optionally comprises a polycarbonate-polysiloxane copolymer comprising polycarbonate blocks and polydiorganosiloxane blocks. The polycarbonate blocks in the copolymer comprise repeating structural units of formula (1) as described above, for example wherein $R^1$ is of formula (2) as described above. These units may be derived from reaction of dihydroxy compounds of formula (3) as described above. In one embodiment, the dihydroxy compound is bisphenol A, in which each of $A^1$ and $A^2$ is p-phenylene and $Y^1$ is isopropylidene.

The polydiorganosiloxane blocks comprise repeating structural units of formula (11) (sometimes referred to herein as 'siloxane'):

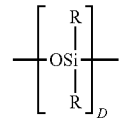

(11)

wherein each occurrence of R is same or different, and is a $C_{1-13}$ monovalent organic radical. For example, R may be a $C_1$-$C_{13}$alkyl group, $C_1$-$C_{13}$alkoxy group, $C_2$-$C_{13}$alkenyl group, $C_2$-$C_{13}$alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$aralkyl group, $C_7$-$C_{13}$aralkoxy group, $C_7$-$C_{13}$alkaryl group, or $C_7$-$C_{13}$alkaryloxy group. Combinations of the foregoing R groups may be used in the same copolymer.

The value of D in formula (11) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, for example, less than about 40, it may be desirable to use a relatively larger amount of the polycarbonate-polysiloxane copolymer. Conversely, where D is of a higher value, for example, greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (12):

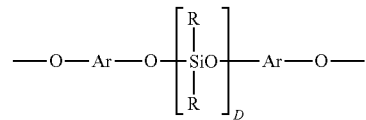

(12)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (12) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl) methane, 1,1-bis(4-hydroxyphenyl)ethane, 2,2-bis(4-hydroxyphenyl) propane, 2,2-bis(4-hydroxyphenyl)butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulphide), and 1,1-bis(4-hydroxy-t-butylphenyl)propane. Combinations comprising at least one of the foregoing dihydroxy compounds may also be used.

Such units may be derived from the corresponding dihydroxy compound of the following formula:

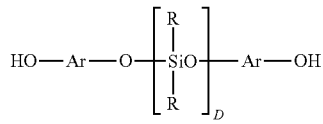

wherein Ar and D are as described above. Such compounds are further described in U.S. Pat. No. 4,746,701 to Kress et al. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (13)

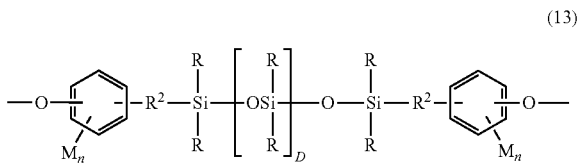

wherein R and D are as defined above. $R^2$ in formula (13) is a divalent $C_2$-$C_8$ aliphatic group. Each M in formula (13) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$aralkyl, $C_7$-$C_{12}$aralkoxy, $C_7$-$C_{12}$alkaryl, or $C_7$-$C_{12}$alkaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (14):

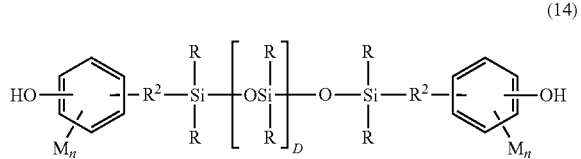

wherein R, D, M, $R^2$, and n are as described above.

Such dihydroxy polysiloxanes can be made by effecting a platinum catalyzed addition between a siloxane hydride of the formula (15),

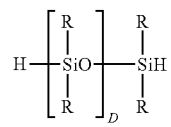

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polycarbonate-polysiloxane copolymer may be manufactured by reaction of diphenolic polysiloxane (14) with a carbonate source and a dihydroxy aromatic compound of formula (3), optionally in the presence of a phase transfer catalyst as described above. Suitable conditions are similar to those useful in forming polycarbonates. For example, the copolymers are prepared by phosgenation, at temperatures from below 0° C. to about 100° C., specifically about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, for example, may be about 1 wt. % to about 99 wt. % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt. % to about 75 wt. %, or about 1 wt. % to about 50 wt. % polydimethylsiloxane, or an equivalent molar amount of another polydiorganosiloxane. In one embodiment, the copolymer comprises about 5 wt. % to about 40 wt. %, optionally about 5 wt. % to about 25 wt. % polydimethylsiloxane, or an equivalent molar amount of another polydiorganosiloxane, with the balance being polycarbonate. In a particular embodiment, the copolymer may comprise about 20 wt. % siloxane.

The polycarbonate-polysiloxane copolymers have a weight-avetage molecular weight (MW, measured, for example, by gel permeation chromatography, ultra-centrifugation, or light scattering) of about 10,000 g/mol to about 200,000 g/mol, specifically about 20,000 g/mol to about 100,000 g/mol.

The composition may further comprise an ungrafted rigid copolymer. The rigid copolymer is additional to any rigid copolymer present in the impact modifier. It may be the same as any of the rigid copolymers described above, without the elastomer modification. The rigid copolymers generally have a Tg greater than about 15° C., specifically greater than about 20° C., and include, for example, polymers derived from monovinylaromatic monomers containing condensed aromatic ring structures, such as vinyl naphthalene, vinyl anthracene and the like, or monomers of formula (9) as broadly described above, for example styrene and alpha-methyl styrene; monovinylic monomers such as itaconic acid, acrylamide, N-substituted acrylamide or methacrylamide, maleic anhydride, maleimide, N-alkyl, aryl or haloaryl substituted maleimide, glycidyl (meth)acrylates, and monomers of the general formula (10) as broadly described above, for example acrylonitrile, methyl acrylate and methyl methacrylate; and copolymers of the foregoing, for example styrene-acrylonitrile (SAN), styrene-alpha-methyl styrene-acrylonitrile, methyl methacrylate-acrylonitrile-styrene, and methyl methacrylate-styrene.

The rigid copolymer may comprise about 1 to about 99 wt. %, specifically about 20 to about 95 wt. %, more specifically about 40 to about 90 wt. % of vinylaromatic monomer, together with 1 to about 99 wt. %, specifically about 5 to about 80 wt. %, more specifically about 10 to about 60 wt. % of copolymerizable monovinylic monomers. In one embodiment the rigid copolymer is SAN, which may comprise about 50 to about 99 wt. % styrene, with the balance acrylonitrile, specifically about 60 to about 90 wt. % styrene, and more specifically about 65 to about 85 wt. % styrene, with the remainder acrylonitrile.

The rigid copolymer may be manufactured by bulk, suspension, or emulsion polymerization, and is substantially free of impurities, residual acids, residual bases or residual metals that may catalyze the hydrolysis of polycarbonate. In one embodiment, the rigid copolymer is manufactured by bulk polymerization using a boiling reactor. The rigid copolymer may have a weight average molecular weight of about 50,000 to about 300,000 as measured by GPC using polystyrene standards. In one embodiment, the weight average molecular weight of the rigid copolymer is about 70,000 to about 190,000.

In addition to the foregoing components previously described, the polycarbonate compositions further comprise a flame retardant, for example an organic phosphates and/or an organic compound containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

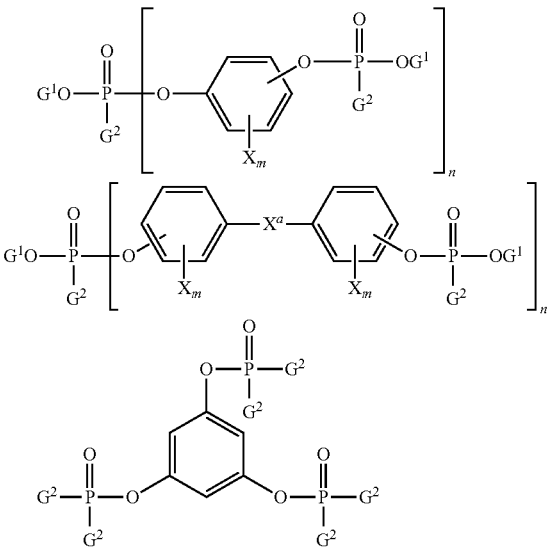

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m 0 to 4, and n is 1 to about 30. Examples of suitable di- or polyfunctional aromatic phosphorus-containing compounds include resorcinol tetraphenyl diphosphate (RDP), the bis(diphenyl) phosphate of hydroquinone and the bis(diphenyl) phosphate of bisphenol-A (, respectively, their oligomeric and polymeric counterparts, and the like. Methods for the preparation of the aforementioned di- or polyfunctional aromatic compounds are described in British Patent No. 2,043,083.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. The organic phosphorus-containing flame retardants are generally present in amounts of about 0.5 to about 20 parts by weight, based on 100 parts by weight of the total composition, exclusive of any filler.

The thermoplastic composition may be essentially free of chlorine and bromine, particularly chlorine and bromine flame retardants. "Essentially free of chlorine and bromine" as used herein refers to materials produced without the intentional addition of chlorine, bromine, and/or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine may be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of polycarbonate, impact modifier and fire retardant.

Exemplary suitable flame retardant compounds containing phosphorus-nitrogen bonds include phosphonitrilic chloride and tris(aziridinyl) phosphine oxide. When present, phosphorus-containing flame retardants are generally present in amounts of about 1 to about 20 parts by weight, based on 100 parts by weight of polycarbonate component and the impact modifier composition.

Halogenated materials may also be used as flame retardants, for example halogenated compounds and resins of the formula (16):

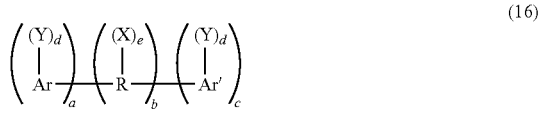

(16)

wherein R is an alkylene, alkylidene or cycloaliphatic linkage, e.g., methylene, propylene, isopropylidene, cyclohexylene, cyclopentylidene, and the like; an oxygen ether, carbonyl, amine, or a sulfur containing linkage, e.g., sulfide, sulfoxide, sulfone, and the like; or two or more alkylene or alkylidene linkages connected by such groups as aromatic, amino, ether, carbonyl, sulfide, sulfoxide, sulfone, and the like groups; Ar and Ar' are each independently a mono- or polycarbocyclic aromatic group such as phenylene, biphenylene, terphenylene, naphthylene, and the like, wherein hydroxyl and Y substituents on Ar and Ar' can be varied in the ortho, meta or para positions on the aromatic rings and the groups can be in any possible geometric relationship with respect to one another; each Y is independently an organic, inorganic or organometallic radical, for example (1) a halogen such as chlorine, bromine, iodine, or fluorine, (2) an ether group of the general formula —OE, wherein E is a monovalent hydrocarbon radical similar to X, (3) monovalent hydrocarbon groups of the type represented by R or (4) other substituents, e.g., nitro, cyano, and the like, the substituents being essentially inert provided there be at least one and preferably two halogen atoms per aryl nucleus; each X is independently a monovalent $C_{1-18}$ hydrocarbon group such as methyl, propyl, isopropyl, decyl, phenyl, naphthyl, biphenyl, xylyl, tolyl, benzyl, ethylphenyl, cyclopentyl, cyclohexyl, and the like, each optionally containing inert substituents; each d is independently 1 to a maximum equivalent to the number of replaceable hydrogens substituted on the aromatic rings comprising Ar or Ar'; each e is independently 0 to a maximum equivalent to the number of replaceable hydrogens on R; and each a, b, and c is independently a whole number, including 0, with the proviso that when b is 0, either a or c, but not both, may be 0, and when b is not 0, neither a nor c may be 0.

Included within the scope of the above formula are bisphenols of which the following are representative: bis(2,6-dibromophenyl)methane; 1,1-bis-(4-iodophenyl)ethane; 2,6-bis (4,6-dichloronaphthyl)propane; 2,2-bis(2,6-dichlorophenyl) pentane; bis(4-hydroxy-2,6-dichloro-3-methoxyphenyl) methane; and 2,2-bis(3-bromo-4-hydroxyphenyl)propane. Also included within the above structural formula are 1,3-dichlorobenzene, 1,4-dibrombenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like. Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants are generally used in amounts of about 1 to about 50 parts by weight, based on 100 parts by weight of the polycarbonate component, the polycarbonate-polysiloxane copolymer, the impact modifier, and the flame retardant additive.

Inorganic flame retardants may also be used, for example salts of $C_{2-16}$ alkyl sulfonates such as potassium perfluorobutane sulfonate (Rimar salt), potassium perfluorooctane sulfonate, tetraethylammonium perfluorohexane sulfonate, and potassium diphenylsulfone sulfonate; salts such as $CaCO_3$, $BaCO_3$, and $BaCO_3$; salts of fluoro-anion complex such as $Li_3AlF_6$, $BaSiF_6$, $KBF_4$, $K_3AlF_6$, $KAlF_4$, $K_2SiF_6$, and $Na_3AlF_6$; and the like. When present, inorganic flame retardant salts are generally present in amounts of about 0.01 to about 25 parts by weight, more specifically about 0.1 to about 10 parts by weight, based on 100 parts by weight of the polycarbonate component, the polycarbonate-polysiloxane copolymer, the impact modifier, and the flame retardant additive.

The relative amount of each component of the thermoplastic composition will depend on the particular type of polycarbonate(s) used, the presence of any other resins, and the particular impact modifiers, including any rigid graft copolymer, as well as the desired properties of the composition. Particular amounts may be readily selected by one of ordinary skill in the art using the guidance provided herein.

In one embodiment, the thermoplastic composition comprises about 15 to about 98 wt. % polycarbonate homopolymer or copolymer having repeat units of the structure (17), about 1 to about 20 wt. % of an impact modifier, and about 1 to about 30 wt. % flame retardant, and optionally about 5 to about 40 wt. % of a polycarbonate-polysiloxane copolymer and about 5 to about 50 wt. % of a polycarbonate. In another embodiment, the thermoplastic composition comprises about 15 to about 96 wt. % polycarbonate homopolymer or copolymer having repeat units of the structure (17), about 1 to about 15 wt. % of an impact modifier, and about 3 to about 20 wt. % flame retardant, and optionally about 5 to about 30 wt. % of a polycarbonate-polysiloxane copolymer and/or about 50 to about 50 wt. % of a polycarbonate. In an embodiment, the amount of polycarbonate homopolymer or copolymer having repeat units of the structure (17) in the composition is at least 15 wt. %, based on the total weight of the composition. The foregoing compositions may further optionally comprise a rigid copolymer (i.e. SAN) and an Antidrip agent (i.e., TSAN), if desired and if it does not detract from the physical properties and flame performance. All of the foregoing amounts are based on the combined weight of the total composition.

In addition to the polycarbonate component, the impact modifier composition and the flame retardant, the thermoplastic composition may include various additives such as fillers, reinforcing agents, stabilizers, and the like, with the proviso that the additives do not adversely affect the desired properties of the thermoplastic compositions. Mixtures of additives may be used. Such additives may be mixed at a suitable time during the mixing of the components for forming the composition.

Suitable fillers or reinforcing agents that may be used include, for example, silicates and silica powders such as aluminum silicate (mullite), synthetic calcium silicate, zirconium silicate, fused silica, crystalline silica graphite, natural silica sand, and the like; boron powders such as boron-nitride powder, boron-silicate powders, and the like; oxides such as $TiO_2$, aluminum oxide, magnesium oxide, and the like; calcium sulfate (as its anhydride, dihydrate or trihydrate); calcium carbonates such as chalk, limestone, marble, synthetic precipitated calcium carbonates, and the like; talc, including fibrous, modular, needle shaped, lamellar talc, and the like; wollastonite; surface-treated wollastonite; glass spheres such as hollow and solid glass spheres, silicate spheres, cenospheres, aluminosilicate (atmospheres), and the like; kaolin, including hard kaolin, soft kaolin, calcined kaolin, kaolin comprising various coatings known in the art to facilitate compatibility with the polymeric matrix resin, and the like; single crystal fibers or "whiskers" such as silicon carbide, alumina, boron carbide, iron, nickel, copper, and the like; fibers (including continuous and chopped fibers) such as asbestos, carbon fibers, glass fibers, such as E, A, C, ECR, R, S, D, or NE glasses, and the like; sulfides such as molybdenum sulfide, zinc sulfide and the like; barium species such as barium titanate, barium ferrite, barium sulfate, heavy spar, and the like; metals and metal oxides such as particulate or fibrous aluminum, bronze, zinc, copper and nickel and the like; flaked fillers such as glass flakes, flaked silicon carbide, aluminum diboride, aluminum flakes, steel flakes and the like; fibrous fillers, for example short inorganic fibers such as those derived from blends comprising at least one of aluminum silicates, aluminum oxides, magnesium oxides, and calcium sulfate hemihydrate and the like; natural fillers and reinforcements, such as wood flour obtained by pulverizing wood, fibrous products such as cellulose, cotton, sisal, jute, starch, cork flour, lignin, ground nut shells, corn, rice grain husks and the like; organic fillers such as polytetrafluoroethylene (Teflon) and the like; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) and the like; as well as additional fillers and reinforcing agents such as mica, clay, feldspar, flue dust, fillite, quartz, quartzite, perlite, tripoli, diatomaceous earth, carbon black, and the like, and combinations comprising at least one of the foregoing fillers and reinforcing agents. The fillers/reinforcing agents may be coated to prevent reactions with the matrix or may be chemically passivated to neutralize catalytic degradation site that might promote hydrolytic or thermal degradation.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber and the like. Fibrous fillers may be supplied in the form of, for example, rovings, woven fibrous reinforcements, such as 0-90 degree fabrics and the like; non-woven fibrous reinforcements such as continuous strand mat, chopped strand mat, tissues, papers and felts and the like; or three-dimensional reinforcements such as braids. Fillers are generally used in amounts of about 0 to about 100 parts by weight, based on 100 parts by weight of the total composition.

Suitable antioxidant additives include, for example, alkylated monophenols or polyphenols; alkylated reaction products of polyphenols with dienes, such as tetrakis[methylene (3,5-di-tert-butyl-4-hydroxyhydrocinnamate)]methane, and the like; butylated reaction products of para-cresol or dicyclopentadiene; alkylated hydroquinones; hydroxylated thiodiphenyl ethers; alkylidene-bisphenols; benzyl species; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; and the like; and combinations comprising at least one of the foregoing antioxidants. Antioxidants are generally used in amounts of about 0.01 to about 1, specifically about 0.1 to about 0.5 parts by weight, based on 100 parts by weight of parts by weight of the total composition.

Suitable heat and color stabilizer additives include, for example, organophosphites such as tris(2,4-di-tert-butyl phenyl) phosphite. Heat and color stabilizers are generally used in amounts of about 0.01 to about 5, specifically about 0.05 to about 0.3 parts by weight, based on 100 parts by weight of the total composition.

Suitable secondary heat stabilizer additives include, for example thioethers and thioesters such as pentaerythritol tetrakis (3-(dodecylthio)propionate), pentaerythritol tetrakis[3-(3,5-di-tert-butyl-4-hydroxyphenyl)propionate], dilauryl thiodipropionate, distearyl thiodipropionate, dimyristyl thiodipropionate, ditridecyl thiodipropionate, pentaerythritol octylthiopropionate, dioctadecyl disulphide, and the like, and combinations comprising at least one of the foregoing heat stabilizers. Secondary stabilizers are generally used in amount of about 0.01 to about 5, specifically about 0.03 to about 0.3 parts by weight, based upon 100 parts by weight of parts by weight of the total composition.

Light stabilizers, including ultraviolet light (UV) absorbing additives, may also be used. Suitable stabilizing additives of this type include, for example, benzotriazoles and hydroxybenzotriazoles such as 2-(2-hydroxy-5-methylphenyl)benzotriazole, 2-(2-hydroxy-5-tert-octylphenyl)-benzotriazole, 2-(2H-benzotriazol-2-yl)-4-(1,1,3,3-tetramethylbutyl)-phenol (CYASORB™ 5411 from Cytec), and TINUVIN™ 234 from Ciba Specialty Chemicals; hydroxybenzotriazines; hydroxyphenyl-triazine or - pyrimidine UV absorbers such as TINUVIN™ 1577 (Ciba), and 2-[4,6-bis (2,4-dimethylphenyl)-1,3,5-triazin-2-yl]-5-(octyloxy)-phenol (CYASORB™ 1164 from Cytec); non-basic hindered amine light stabilizers (hereinafter "HALS"), including substituted piperidine moieties and oligomers thereof, for example 4-piperidinol derivatives such as TINUVIN™ 622 (Ciba), GR-3034, TINUVIN™ 123, and TINUVIN™ 440; benzoxazinones, such as 2,2'-(1,4-phenylene)bis(4H-3,1-benzoxazin-4-one) (CYASORB™ UV-3638); hydroxybenzophenones such as 2-hydroxy-4-n-octyloxybenzophenone (CYASORB™ 531); oxanilides; cyanoacrylates such as 1,3-bis[(2-cyano-3,3-diphenylacryloyl)oxyl-2,2-bis[[(2-cyano-3,3-diphenylacryloyl)oxylmethyl]propane (UVINUL™ 3030) and 1,3-bis[(2-cyano-3,3-diphenylacryloyl)oxyl -2,2-bis[[(2-cyano-3,3-diphenylacryloyl)oxylmethyl]propane; and nano-size inorganic materials such as titanium oxide, cerium oxide, and zinc oxide, all with particle size less than about 100 nanometers; and the like, and combinations comprising at least one of the foregoing stabilizers. Light stabilizers may be used in amounts of about 0.01 to about 10, specifically about 0.1 to about 1 parts by weight, based on 100 parts by weight of parts by weight of the total composition.

UV absorbers are generally used in amounts of about 0.1 to about 5 parts by weight, based on 100 parts by weight of the total composition.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax and the like; and poly alpha olefins such as Ethylflo™ 164, 166, 168, and 170. Such materials are generally used in amounts of about 0.1 to about 20 parts by weight, specifically about 1 to about 10 parts by weight, based on 100 parts by weight of the total composition.

Colorants such as pigment and/or dye additives may also be present. Suitable pigments include for example, inorganic pigments such as metal oxides and mixed metal oxides such as zinc oxide, titanium dioxides, iron oxides and the like; sulfides such as zinc sulfides, and the like; aluminates; sodium sulfo-silicates sulfates, chromates, and the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, and combinations comprising at least one of the foregoing pigments. Pigments may be coated to prevent reactions with the matrix or may be chemically passivated to neutralize catalytic degradation site that might promote hydrolytic or thermal degradation. Pigments are generally used in amounts of about 0.01 to about 10 parts by weight, based on 100 parts by weight of parts by weight of the total composition.

Suitable dyes are generally organic materials and include, for example, coumarin dyes such as coumarin 460 (blue), coumarin 6 (green), nile red and the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, and the like; luminescent dyes such as 5-amino-9-diethylimi- nobenzo(a)phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'-diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-azaquinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3-methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridiniumperchlorate; 1-ethyl-2-(4-(p-dimethylaminophenyl)-1,3-butadienyl)-pyridinium perchlorate; 1-ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a) phenoxazonium perchlorate; 7-ethylamino-6-methyl-4-trifluoromethylcoumarin; 7-ethylamino-4-trifluoromethylcoumarin; 1,1',3,3,3',3'-hexamethyl-4,4',5,5'-dibenzo-2,2'-indotricarboccyanine iodide; 1,1',3,3,3',3'-hexamethylindodicarbocyanine iodide; 1,1',3,3,3',3'-hexamethylindotricarbocyanine iodide; 2-methyl-5-t-butyl-p-quaterphenyl; N-methyl-4-trifluoromethylpiperidino-<3,2-g>coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5,3'''',5''''-tetra-t-butyl-p-sexiphenyl; 3,5,3''',5'''-tetra-t-butyl-p-quinquephenyl; 2,3,5,6-1H,4H-tetrahydro-9-acetylquinolizino-<9,9a,1-gh>coumarin; 2,3,5,6-1H,4H-tetrahydro-9-carboethoxyquinolizino-<9,9a,1-gh>coumarin; 2,3,5,6-1H,4H-tetrahydro-8-methylquinolizino-<9,9a, 1-gh>coumarin; 2,3,5,6-1H,4H-tetrahydro-9-(3-pyridyl)-quinolizino-<9,9a,1-gh>coumarin; 2,3,5,6-1H,4H-tetrahydro-8-trifluoromethylquinolizino-<9,9a,1-gh>coumarin; 2,3,5,6-1H,4H-tetrahydroquinolizino-<9,9a,1-gh>coumarin; 3,3',2'',3'''-tetramethyl-p-quaterphenyl; 2,5,2'''',5''''-tetramethyl-p-quinquephenyl; P-terphenyl; P-quaterphenyl; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene and the like, and combinations comprising at least one of the foregoing dyes. Dyes are generally used in amounts of about 0.1 parts per million to about 10 parts by weight, based on 100 parts by weight of parts by weight of the total composition.

Monomeric, oligomeric, or polymeric antistatic additives that may be sprayed onto the article or processed into the thermoplastic composition may be advantageously used. Examples of monomeric antistatic agents include long chain esters such as glycerol monostearate, glycerol distearate, glycerol tristearate, and the like, sorbitan esters, and ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate and the like, fluorinated alkylsulfonate salts, betaines, and the like. Combinations of the foregoing antistatic agents may be used. Exemplary polymeric antistatic agents include certain polyetheresters, each containing polyalkylene glycol moieties such as polyethylene glycol, polypropylene glycol, polytetramethylene glycol, and the like. Such polymeric antistatic agents are commercially available, and include, for example PELESTAT™ 6321 (Sanyo), PEBAX™ MH1657 (Atofina), and IRGASTAT™ P18 and P22 (Ciba-Geigy). Other polymeric materials that may be used as antistatic agents are inherently conducting polymers such as polythiophene (commercially available from Bayer), which retains some of its intrinsic conductivity after melt processing at elevated temperatures. In one embodiment, carbon fibers, carbon nanofibers, carbon nanotubes, carbon black or any combination of the foregoing may be used in a polymeric resin containing chemical antistatic agents to render the composition electrostatically dissipative. Antistatic agents are generally used in amounts of about 0.1 to about 10 parts by weight, specifically about based on 100 parts by weight of the total composition.

Where a foam is desired, suitable blowing agents include, for example, low boiling halohydrocarbons and those that generate carbon dioxide; blowing agents that are solid at room temperature and when heated to temperatures higher than their decomposition temperature, generate gases such as nitrogen, carbon 25 dioxide ammonia gas, such as azodicarbonamide, metal salts of azodicarbonamide, 4,4'-oxybis(benzenesulfonylhydrazide), sodium bicarbonate, ammonium carbonate, and the like, or combinations comprising at least one of the foregoing blowing agents. Blowing agents are generally used in amounts of about 0.5 to about 20 parts by weight, based on 100 parts by weight of the total composition.

Anti-drip agents may also be used, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, about 50 wt. % PTFE and about 50 wt. % SAN, based on the total weight of the encapsulated fluoropolymer. The SAN may comprise, for example, about 75 wt. % styrene and about 25 wt. % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents are generally used in amounts of about 0.1 to about 10 parts by weight, based on 100 parts by weight of the total composition.

The thermoplastic compositions may be manufactured by methods generally available in the art, for example, in one embodiment, in one manner of proceeding, powdered polycarbonate or polycarbonates, impact modifier, and/or other optional components are first blended, optionally with fillers in a Henschel™ high speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Such additives may also be compounded into a masterbatch with a desired polymeric resin and fed into the extruder. The additives may be added to either the polycarbonate base materials or the impact modifier base material to make a concentrate, before this is added to the final product. The extruder is generally operated at a temperature higher than that necessary to cause the composition to flow, typically 500° F. (260° C.) to 650° F. (343° C.). The extrudate is immediately quenched in a water batch and pelletized. The pellets, so prepared, when cutting the extrudate may be one-fourth inch long or less as desired. Such pellets may be used for subsequent molding, shaping, or forming.

Shaped, formed, or molded articles comprising the thermoplastic compositions are also provided. The thermoplastic compositions may be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, battery packs, electrical connectors, and components of lighting fixtures, televisions, ornaments, home appliances, roofs, greenhouses, sun rooms, swimming pool enclosures, and the like.

The compositions find particular utility in electronics, business equipment and equipment housings, such as televisions, computers, notebook computers, cell phones, battery packs, Personal Data Assistants (PDAs), printers, copiers, projectors, facsimile machines, wireless devices, digital cameras and camera housings, television bezels, and other equipment and devices known in the art.

Heat Deflection Temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. Heat Deflection Test (HDT) was determined per ASTM D648, using a flat, one-eighth inch thick bar, molded Tensile bar subjected to 1.82 MPa. The compositions described herein may further have additional excellent physical properties and good processability. For example, the thermoplastic polycarbonate compositions may have a heat deflection temperature (HDT) of about 60 to about 120° C., optionally about 70 to 100° C., measured at 1.82 MPa on a one-eighth inch thick bar according to ASTM D648.

Instrumental Impact (or Multi-Axial Impact (MAI) or Dynatup Plaque Impact Energy) was measured according to D3763 using a plaque 3.2 mm thick, 10 centimeters diameter, with a dart diameter of 12.5 mm at 6.6 m/s. The results represent the total energy absorbed and are reported in Joules. This procedure provides information on how a material behaves under multiaxial deformation conditions. The deformation applied is a high speed puncture. The final test result is calculated as the average of the test results of ten test plaques.

Percent ductility was determined on 3.2 mm (one-eighth inch) plaques (as molded for Instrumental Impact test according to D3763) at room temperature using the impact energy as well as stress whitening of the fracture surface. Generally, significant stress whitening of the fractured surface accompanied by gross deformation at the fractured tip can indicate ductile failure mode; conversely, lack of significant stress whitening of the fractured surface accompanied by gross deformation at the fractured tip can indicate brittle failure mode. Ten bars were tested, and percent ductility is expressed as a percentage of impact bars that exhibited ductile failure mode. Ductility tends to decrease with temperature, and the ductile transition temperature is the temperature at which % ductility equals 50%.

Tensile properties such as Tensile Modulus and Tensile Elongation at Break were determined using Type I 3.2 mm thick molded tensile bars and tested per ASTM D638 at a pull rate of 1 mm/min. until 1% strain, followed by a rate of 50 mm/min. until the sample broke. It is also possible to measure at 5 mm/min. if desired for the specific application, but the samples measured in these experiments were measured at 50 mm/min. Tensile Modulus results are reported as MPa, and Tensile Elongation at Break is reported as a percentage.

Spiral Flow Length testing was performed according to the following procedure. A molding machine with a barrel capacity of 3 to 5 ounces (85 to 140 g) and channel depths of 0.03, 0.06, 0.09, or 0.12 inches (0.76, 1.52, 2.29, or 3.05 millimeters, respectively) is loaded with pelletized thermoplastic composition. The mold and barrel are heated to a temperature suitable to flow the polymer, typically 285 to 330° C. The thermoplastic composition, after melting and temperature equilibration, is injected into the selected channel of the mold at 1500 psi (10.34 MPa) for a minimum flow time of 6 seconds, at a rate of 6.0 inches (15.24 cm) per second, to allow for maximum flow prior to gate freeze. Successive samples are generated using a total molding cycle time of 35 seconds. Samples are retained for measurement either after 10 runs have been completed, or when successively prepared samples are of consistent size. Five samples are then collected and measured to within the nearest 0.25 inches (0.64 cm), and a median length for the five samples is reported. As reported herein, spiral flow was determined at 260° C., 1500 psi fill pressure, 6-second injection, with 2.3 mm wall thickness.

Scratch Testing was measured using the Pencil Hardness Test ASTM D3363. Pencil hardness is a standard method to test scratch resistance. Pencil lead comes in varying degrees of hardness. A soft lead leaves a heavy dark line while a hard lead leaves a finer gray line. The standard hardness of pencils goes (hardest to softest) 6H, 5H, 4H, 3H, 2H, H, F, HB, B, 2B, 3B, 4B, 5B, 6B. When the pencil lead is drawn across the surface of a sample a soft lead may not scratch the sample while a hard lead may. Samples can then be rated by the hardness of the pencil lead that will scratch the surface. The Pencil Hardness test was performed at a one (1) kg force load at room temperature.

Flammability tests were performed following the procedure of Underwriter's Laboratory Bulletin 94 entitled "Tests for Flammability of Plastic Materials, UL94." According to this procedure, materials may be classified as UB, V0, UL94 V1, V2, 5VA and/or 5VB on the basis of the test results obtained for five samples at the specified sample thicknesses. The criteria for each of these flammability classifications are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow. Five bar flame out time (FOT) is the sum of the flame out time for five bars, each lit twice for a maximum flame out time of 50 seconds. FOT1 is the average flame out time after the first light. FOT2 is the average flame out time after the second light.

V1, V2, FOT: In a sample placed so that its long axis is 180 degrees to the flame, the average period of flaming and/or smoldering after removing the igniting flame does not exceed twenty-five seconds and, for a V1 rating, none of the vertically placed samples produces drips of burning particles that ignite absorbent cotton. The V2 standard is the same as V1, except that drips are permitted. Five bar flame out time (FOT) is the sum of the flame out time for five bars, each lit twice for a maximum flame out time of 250 seconds.

5VB: a flame is applied to a vertically fastened, 5-inch (127 mm) by 0.5-inch (12.7 mm) test bar of a given thickness above a dry, absorbent cotton pad located 12 inches (305 mm) below the bar. The thickness of the test bar is determined using calipers with 0.1 mm accuracy. The flame is a 5-inch (127 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated for until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there may be no drips that ignite the cotton pad. The test is repeated on 5 identical bar specimens. If there is a single specimen of the five that does not comply with the time and/or no-drip requirements then a second set of 5 specimens are tested in the same fashion. All of the specimens in the second set of 5 specimens must comply with the requirements in order for material in the given thickness to achieve the 5VB standard.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$pFTP = (P_{t1>mbt,\ n=0} \times P_{t2>mbt,\ n=0} \times P_{total<=mbt} \times P_{drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt, n=0}$, may be determined from the formula:

$$P_{t1>mbt, n=0} = (1-P_{t1>mbt})^5$$

where $P_{t1>mbt}$ is the area under the log normal distribution curve for t1>mbt, and where the exponent "5" relates to the number of bars tested.

The probability that no second burn time exceeds a maximum burn time value may be determined from the formula:

$$P_{t2>mbt, n=0} = (1-P_{t2>mbt})$$

where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds[5]

The probability $P_{drip, n=0}$ that no specimen exhibits dripping during the flame test is an attribute function, estimated by:

$$(1-P_{drip})^5$$

where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V1 or V2 rating, the maximum total burn time is 250 seconds.

Preferably, p(FTP) is as close to 1 as possible, for example, greater than or equal to about 0.7, optionally greater than or equal to about 0.85, optionally greater than or equal to about 0.9 or, more specifically, greater than or equal to about 0.95, for maximum flame-retardant performance in UL testing. The p(FTP) >0.7, and specifically, p(FTP) >0.85, is a more stringent standard than merely specifying compliance with the referenced V0 or V1 test.

Time to drip (TTD): The time to drip is determined by alternately applying and removing a flame as described for the 5VB test in consecutive 5-second intervals, until the first drip of material falls from the bar. A time to drip characteristic of 55 seconds (s) or greater has been found to correlate well with other desired characteristics such as 5VB ratings.

The invention is further illustrated by the following non-limiting Examples.

Samples were prepared by melt extrusion on a Werner & Pfleiderer 25 mm twin screw extruder, using a nominal melt temperature of 260 to 275° C., 25 inches (635 mm) of mercury vacuum and 500 rpm. The extrudate was pelletized and dried at about 100° C. for about 4 hours.

To make test specimens, the dried pellets were injection molded on a Van Dorn 85-ton injection molding machine at a nominal temperature of 245 to 270° C. to form specimens for most of the tests below. Test bars for flame testing were injection molded at a nominal temperature of 245 to 270° C. on a Husky injection molding machine. Specimens were tested in accordance with ASTM or ISO standards as described above. The following components were used:

TABLE 1

| Component | Type | Source |
| --- | --- | --- |
| PC-1 | High flow BPA polycarbonate resin made by the interfacial process with a molecular weight of about 21,800 Daltons | GE Plastics |
| PC-2 | Low flow BPA polycarbonate resin made by the interfacial process with a molecular weight of about 29,900 Daltons | GE Plastics |
| PC-3 | DMBPC copolymer comprising 50 mol % DMBPC and 50 mol. % BPA polycarbonate having a molecular weight of about 23,500 Daltons | GE Plastics |
| PC-4 | DMBPC copolymer comprising 25 mol % DMBPC and 75 mol. % BPA polycarbonate having a molecular weight of about 19,000 Daltons | GE Plastics |
| PC-5 | DMBPC homopolymer having a molecular weight of about 24,000 Daltons | GE Plastics |
| BABS | Bulk ABS comprising about 16 wt. % polybutadiene and 84 wt. % SAN | GE Plastics |
| ASA-1 | Emulsion polymerized ASA having nominal 45 wt. % polybutyl acrylate rubber and 55 wt. % SAN and having a mean particle size of about 300 nm and a Q value of about 1.4 | GE Plastics |
| ASA-2 | Emulsion polymerized ASA having nominal 45 wt. % polybutyl acrylate rubber and 55 wt. % SAN having a mean particle size of about 105 nm and a Q value of about 0.6 | GE Plastics |
| ASA-3 | Emulsion polymerized ASA having nominal 45 wt. % polybutyl acrylate rubber and 55 wt. % SAN having a mean particle size of about 510 nm and a Q value of about 0.5 | GE Plastics |
| PC-Si | Polysiloxane-polycarbonate copolymer comprising 80 wt. % units derived from BPA and 20 wt. % units derived from dimethylsiloxane | GE Plastics |

TABLE 1-continued

| Component | Type | Source |
|---|---|---|
| SAN | Styrene acrylonitrile comprising 23.5-26.5 wt. % acrylonitrile and 73.5-76.5 wt. % styrene | GE Plastics |
| BPA-DP | Bisphenol A bis(diphenylphosphate) | Supresta |
| TSAN | PTFE encapsulated in SAN (50 wt. % PTFE, 50 wt. % SAN) | GE Plastics |

Samples were produced according to the methods described above using the materials in Table 1, and testing according to the test methods previously described. The sample formulations are shown in Table 2 and test results are shown in Table 3 below.

size distribution of the ASA is also important to scratch resistance. The samples with a mean particle size of the rubber substrate in a range of greater than about 200 nm and a Q value of greater than 1 (Examples 10 and 11) or a mean particle size of the rubber substrate in a range of greater than

TABLE 2

| COMPONENTS | Units | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| PC-1 | % | 0 | 42.20 | 0 | 0 | 25.05 | 5.82 | 0 | 0 | 0 | 0 | 33.98 | 0 | 33.98 | 0 |
| PC-2 | % | 0 | 10.54 | 0 | 0 | 27.69 | 65.72 | 35.77 | 0 | 0 | 0 | 37.56 | 0 | 37.56 | 0 |
| PC-3 | % | 99.5 | 0 | 52.74 | 52.74 | 0 | 0 | 35.77 | 0 | 71.54 | 71.54 | 0 | 71.54 | 0 | 71.54 |
| PC-4 | % | 0 | 0 | 0 | 0 | 0 | 0 | 0 | 71.54 | 0 | 0 | 0 | 0 | 0 | 0 |
| PC-5 | % | 0 | 0 | 0 | 0 | 0 | 0 | 0 | 0 | 0 | 0 | 0 | 0 | 0 | 0 |
| PC-Si | % | 0 | 13 | 13 | 13 | 13 | 14 | 14 | 14 | 14 | 0 | 0 | 0 | 0 | 0 |
| BABS | % | 0 | 6 | 6 | 0 | 0 | 3 | 3 | 3 | 3 | 0 | 0 | 0 | 0 | 0 |
| ASA-1 | % | 0 | 0 | 0 | 6 | 6 | 0 | 0 | 0 | 0 | 17 | 17 | 0 | 0 | 0 |
| ASA-2 | % | 0 | 0 | 0 | 0 | 0 | 0 | 0 | 0 | 0 | 0 | 0 | 17 | 17 | 0 |
| ASA-3 | % | 0 | 0 | 0 | 0 | 0 | 0 | 0 | 0 | 0 | 0 | 0 | 0 | 0 | 17 |
| SAN | % | 0 | 11 | 11 | 11 | 11 | 0 | 0 | 0 | 0 | 0 | 0 | 0 | 0 | 0 |
| BPA-DP | % | 0 | 16 | 16 | 16 | 16 | 10 | 10 | 10 | 10 | 10 | 10 | 10 | 10 | 10 |
| TSAN | % | 0 | 0.80 | 0.80 | 0.80 | 0.8 | 1.00 | 1.00 | 1.00 | 1.00 | 1.00 | 1.00 | 1.00 | 1.00 | 1.00 |
| Others* | % | 0.50 | 0.46 | 0.46 | 0.46 | 0.46 | 0.46 | 0.46 | 0.46 | 0.46 | 0.46 | 0.46 | 0.46 | 0.46 | 0.46 |

*An additive package comprising 0.08 wt. % hindered phenol antioxidant, 0.08 wt. % Tris(di-t-butylphenyl)phosphite and 0.3 wt % mold release agent (based on 100% by weight of the total composition) was also added to samples 2 to 14. Sample 1 had 0.4 wt % mold release agent and 0.10 wt. % Tris(di-t-butylphenyl)phosphite.

TABLE 3

| PHYSICAL PROPERTIES | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Pencil Hardness | | H | 3B | HB | F | 3B | 3B | HB | F | F | F | 2B | B | 3B | F |
| MAI, 23° C. | J | 6 | 17 | 3 | 15 | 65 | 63 | 72 | 68 | 72 | 59 | 58 | 67 | 59 | 56 |
| Ductility | % | 0 | 0 | 0 | 0 | 100 | 100 | 100 | 100 | 100 | 100 | 100 | 100 | 100 | 100 |
| Spiral Flow, 500° F., 90 mils | inches | 7 | 30 | 30 | 29 | 30 | 16 | 15 | 20 | 14 | 15.5 | 16 | 15.5 | 16 | 15 |
| HDT (1/8" at 1.82 MPa) | ° F. | 115 | 76 | 72 | 72 | 74 | 90 | 88 | 87 | 86 | 82 | 86 | 82 | 86 | 81 |
| Tensile Strength at 50 mm/m | MPa | 73 | 69 | 72 | 71 | 68 | 65 | 71 | 70 | 74 | 63 | 58 | 65 | 58 | 62 |
| Tensile Elongation at 50 mm/m | MPa | 20 | 50 | 50 | 68 | 62 | 110 | 95 | 39 | 70 | 110 | 120 | 97 | 120 | 85 |
| 5 V TTD, 2 mm | Sec | 25 | 76 | 70 | 100 | 100 | 100 | 100 | 100 | 95 | 48 | 79 | 46 | 64 | 49 |
| UL94 V at 1.5 mm | Fail or V rating | Fail | V0 | V1 | V0 | V0 | V0 | V0 | V0 | V0 | Fail | V0 | Fail | V0 | Fail |

The above results illustrate that compositions in accordance with the present invention (Examples 4, 7 to 10 and 14) having a DMBPC-PC copolymer and ASA, or a DMBPC-PC copolymer along with PC-Si, have superior scratch performance while maintaining a good balance of physical properties and flame performance. Example 1 is a comparative example showing that using DMBPC copolymer without any impact modifier or other polycarbonate has excellent scratch resistance but suffers from poor ductility and lower flow length as well as poor flame performance. Examples 2, 5, 6, 11 and 13 are comparative examples without DMBPC copolymer that have poor scratch resistance but a good balance of physical properties and flame performance. Increasing the amount of DMBPC in the composition improves the scratch resistance. Examples 10 to 14 show that the particle about 400 nm and a Q value of less than 1 (Example 14) had good scratch performance, while the sample containing the ASA with a mean particle size of the rubber substrate in a range of less than about 200 nm and a Q value of less than 1 (Examples 12 and 13) had poorer scratch performance. Examples 10, 12, and 14, which had no polycarbonate-polysiloxane copolymer, failed the UL 94V tests at 1.5 mm.

As used herein, the terms "first," "second," and the like do not denote any order or importance, but rather are used to distinguish one element from another, and the terms "the", "a" and "an" do not denote a limitation of quantity, but rather denote the presence of at least one of the referenced item. All ranges disclosed herein for the same properties or amounts are inclusive of the endpoints, and each of the endpoints is independently combinable. All cited patents, patent applications, and other references are incorporated herein by reference in their entirety.

The modifier "about" used in connection with a quantity is inclusive of the stated value and has the meaning dictated by the context (e.g., includes the degree of error associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A thermoplastic composition comprising in combination a polycarbonate homopolymer or copolymer comprising repeat carbonate units having the following structure (17):

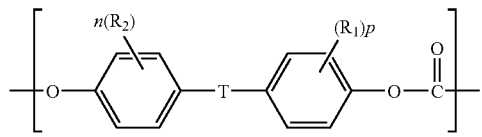

wherein $R_1$ and $R_2$, are independently at each occurrence a $C_1$-$C_4$ alkyl, n and p are each an integer having a value of 1 to 4, and T is selected from the group consisting of $C_5$-$C_{10}$ cycloalkanes attached to the aryl groups at one or two carbons, $C_6$-$C_{13}$ aryl groups, and $C_7$-$C_{12}$ aryl alkyl groups;

an impact modifier, wherein the impact modifier comprises a rubber modified thermoplastic resin comprising a discontinuous elastomeric phase dispersed in a rigid thermoplastic phase, wherein at least a portion of the rigid thermoplastic phase is grafted to the elastomeric phase, and wherein the rubber modified thermoplastic resin employs at least one rubber substrate for grafting and the rubber substrate comprises the discontinuous elastomeric phase of the composition, further wherein the rubber substrate must be susceptible to grafting by at least a portion of a graftable monomer and the rubber substrate is derived from polymerization of at least one monoethylenically unsaturated $(C_1$-$C_{12})$alkyl(meth)acrylate monomers and mixtures comprising at least one of the monomers, and wherein the rigid thermoplastic phase comprises an alkenyl aromatic polymer having structural units derived from one or more alkenyl aromatic monomers and from one or more monoethylenically unsaturated nitrile monomers, and wherein the impact modifier has a mean particle size of the rubber substrate in a range of greater than about 200 nm and a Q value of greater than 1;

a flame retardant; and a polycarbonate-polysiloxane copolymer.

2. The thermoplastic composition of claim 1, wherein the polycarbonate homopolymer or copolymer comprising repeat carbonate units of formula (17) comprise a dialkyl bisphenol polycarbonate homopolymer or copolymer comprising repeat carbonate units having the following structure;

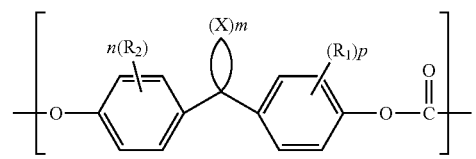

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of $R_1$ or $R_2$ is in the 3 or 3' position, and n+p=2.

3. The thermoplastic composition of claim 1, wherein the amount of carbonate units of formula (17) in the composition is at least 15 wt.%.

4. The thermoplastic composition of claim 2, wherein the polycarbonate homopolymer or copolymer is derived from dialkyl bisphenol units having the structure

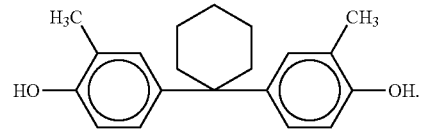

5. The thermoplastic composition of claim 1, wherein the rigid thermoplastic phase of the impact modifier comprises styrene/acrylonitrile copolymers, alpha-methylstyrene/acrylonitrile copolymers, alpha-methylstyrene/styrene/acrylonitrile copolymers, or mixtures comprising two or more of the foregoing copolymers.

6. The thermoplastic composition of claim 1, wherein the rubber substrate of the impact modifier is butyl acrylate.

7. The thermoplastic composition of claim 1, wherein the rigid thermoplastic phase of the impact modifier comprises structural units derived from styrene, acrylonitrile and methyl methacrylate; alpha methyl styrene, acrylonitrile and methacrylate; or styrene, alpha methyl styrene, acrylonitrile and methacrylate.

8. The thermoplastic composition of claim 1, wherein the impact modifier is acrylonitrile-styrene-acrylate or acrylate-modified acrylonitrile-styrene-acrylate.

9. The thermoplastic composition of claim 1, wherein the impact modifier has a mean particle size of from about 250 nm to about 350 nm and wherein 1<Q<2.

10. The thermoplastic composition of claim 1, further comprising an aromatic vinyl copolymer.

11. The thermoplastic composition of claim 1, wherein the composition is capable of achieving a UL94 rating of V1 at a thickness of 1.5 mm or less.

12. The thermoplastic composition of claim 11, wherein the composition is capable of achieving a UL94 rating of V0 at a thickness of 1.5 mm or less.

13. The thermoplastic composition of claim 1, wherein the composition has UL 94 5V time to drip at 2 mm of at least 60 seconds.

14. The thermoplastic composition of claim 1, wherein the flame retardant is a phosphorous containing flame retardant.

15. An article comprising the thermoplastic composition of claim 1.

16. The article of claim 15, wherein the article has a scratch resistance of HB or greater when measured according to the ASTM D3363 Pencil Hardness Test at 1 kg force.

17. A thermoplastic composition comprising in combination a dimethyl bisphenol cyclohexane copolymer derived from dialkyl bisphenol monomer units having the structure

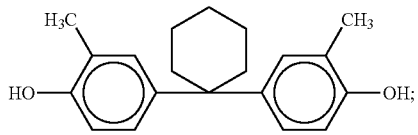

a polycarbonate-polysiloxane copolymer;
an impact modifier,
wherein the impact modifier is acrylonitrile-styrene-acrylate or acrylate-modified acrylonitrile-styrene-acrylate, and wherein the impact modifier has a mean particle size of the rubber substrate in a range of greater than about 200 nm and a Q value of greater than 1; and
a flame retardant.

18. The thermoplastic composition of claim 17, wherein the amount of dimethyl bisphenol cyclohexane monomer in the composition is at least 15 wt.%.

19. The composition of claim 17, wherein the impact modifier has a mean particle size of from about 250 nm to about 350 nm and wherein 1<Q<2.

20. The thermoplastic composition of claim 17, wherein the composition is capable of achieving a UL94 rating of V1 at a thickness of 1.5 mm or less.

21. A thermoplastic composition comprising in combination
a polycarbonate homopolymer or copolymer comprising repeat carbonate units having the following structure (17):

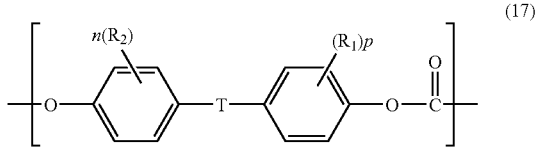

wherein $R_1$ and $R_2$ are independently at each occurrence a $C_1$-$C_4$alkyl, n and p are each an integer having a value of 1 to 4, and T is selected from the group consisting of $C_5$-$C_{10}$ cycloalkanes attached to the aryl groups at one or two carbons, $C_6$-$C_{13}$ aryl groups, and $C_7$-$C_{12}$ aryl alkyl groups;
an impact modifier,
wherein the impact modifier comprises a rubber modified thermoplastic resin comprising a discontinuous elastomeric phase dispersed in a rigid thermoplastic phase, wherein at least a portion of the rigid thermoplastic phase is grafted to the elastomeric phase, and wherein the rubber modified thermoplastic resin employs at least one rubber substrate for grafting and the rubber substrate comprises the discontinuous elastomeric phase of the composition, further wherein the rubber substrate must be susceptible to grafting by at least a portion of a graftable monomer and the rubber substrate is derived from polymerization of at least one monoethylenically unsaturated ($C_1$-$C_{12}$)alkyl(meth)acrylate monomers and mixtures comprising at least one of the monomers, and wherein the rigid thermoplastic phase comprises an alkenyl aromatic polymer having structural units derived from one or more alkenyl aromatic monomers and from one or more monoethylenically unsaturated nitrile monomers, and wherein the impact modifier has a mean particle size of the rubber substrate in a range of greater than about 400 nm and a Q value of less than 1;
a flame retardant; and
a polycarbonate-polysiloxane copolymer.

22. The thermoplastic composition of claim 21, wherein the polycarbonate homopolymer or copolymer comprising repeat carbonate units of formula (17) comprise a diallyl bisphenol polycarbonate homopolymer or copolymer comprising repeat carbonate units having the following structure;

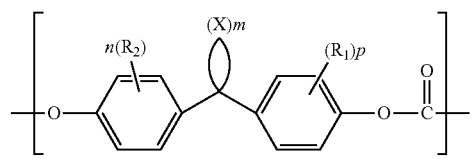

wherein $R_1$ and $R_2$ are independently selected from the group consisting of $C_1$ to $C_6$ alkyl; X represents $CH_2$; m is an integer from 4 to 7; n is an integer from 1 to 4; and p is an integer from 1 to 4, with the proviso that at least one of $R_1$ or $R_2$ is in the 3 or 3' position, and n+p=2.

23. The thermoplastic composition of claim 21, wherein the amount of carbonate units of formula (17) in the composition is at least 15 wt.%.

24. The thermoplastic composition of claim 22, wherein the polycarbonate copolymer is derived from dialkyl bisphenol monomer units having the structure

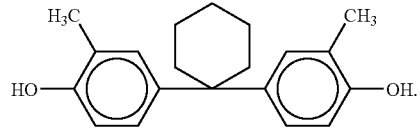

25. The thermoplastic composition of claim 21, wherein the rubber substrate of the impact modifier is butyl acrylate.

26. The thermoplastic composition of claim 21, wherein the impact modifier is acrylonitrile-styrene-acrylate or acrylate-modified acrylonitrile-styrene-acrylate.

27. The thermoplastic composition of claim 21, wherein the impact modifier has a mean particle size of from about 400 nm to about 600 nm and wherein 0.2<Q<0.8.

28. The thermoplastic composition of claim 21, further comprising an aromatic vinyl copolymer.

29. The thermoplastic composition of claim 21, wherein the composition is capable of achieving a UL94 rating of V1 at a thickness of 1.5 mm or less.

30. The thermoplastic composition of claim 29, wherein the composition is capable of achieving a UL94 rating of V0 at a thickness of 1.5 mm or less.

31. The thermoplastic composition of claim 21, wherein the composition has UL 94 5V time to drip at 2 mm of at least 60 seconds.

32. The thermoplastic composition of claim 21, wherein the flame retardant is a phosphorous containing flame retardant.

33. An article comprising the thermoplastic composition of claim 21.

34. The article of claim 33, wherein the article has a scratch resistance of HB or greater when measured according to the ASTM D3363 Pencil Hardness Test at 1 kg force.

35. A thermoplastic composition comprising in combination a dimethyl bisphenol cyclohexane homopolymer or copolymer derived from dialkyl bisphenol monomer units having the structure

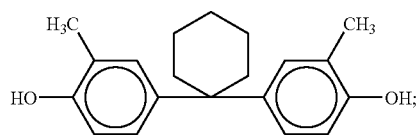

a polycarbonate-polysiloxane copolymer;

an impact modifier, wherein the impact modifier is acrylonitrile-styrene-acrylate or acrylate-modified acrylonitrile-styrene-acrylate, and wherein the impact modifier has a mean particle size of the rubber substrate in a range of greater than about 400 nm and a Q value of less than 1; and a flame retardant.

36. The thermoplastic composition of claim 35, wherein the amount of dimethyl bisphenol cyclohexane monomer in the composition is at least 15 wt.%.

37. The composition of claim 35, wherein the impact modifier has a mean particle size of from about 400 nm to about 600 nm and wherein $0.2<Q<0.8$.

38. The thermoplastic composition of claim 35, wherein the composition is capable of achieving a UL94 rating of V1 at a thickness of 1.5 mm or less.

* * * * *